United States Patent
Ito et al.

(10) Patent No.: US 9,546,607 B2
(45) Date of Patent: Jan. 17, 2017

(54) VARIABLE VALVE DEVICE OF INTERNAL COMBUSTION ENGINE

(75) Inventors: Hisaki Ito, Gotenba (JP); Takashi Ogawa, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 178 days.

(21) Appl. No.: 14/387,296

(22) PCT Filed: Mar. 23, 2012

(86) PCT No.: PCT/JP2012/057474
§ 371 (c)(1),
(2), (4) Date: Sep. 23, 2014

(87) PCT Pub. No.: WO2013/140596
PCT Pub. Date: Sep. 26, 2013

(65) Prior Publication Data
US 2015/0090220 A1    Apr. 2, 2015

(51) Int. Cl.
*F02D 13/02* (2006.01)
*F02D 41/00* (2006.01)
(Continued)

(52) U.S. Cl.
CPC ........ *F02D 13/0226* (2013.01); *F01L 13/0036* (2013.01); *F01L 13/0063* (2013.01);
(Continued)

(58) Field of Classification Search
CPC .......... F02D 13/0226; F02D 13/0223; F02D 13/023; F02D 13/0234; F02D 13/0238; F02D 41/0002; F02D 2041/001; F02D 2041/0015; F02M 26/66; F02M 63/0033; F01L 2013/10; F01L 2800/00; F02B 2031/006
(Continued)

(56) References Cited

U.S. PATENT DOCUMENTS 7,152,578 B2 * 12/2006 Yui ................ F02D 13/0226
123/348
8,061,311 B2 * 11/2011 Nakamura ........... F01L 1/3442
123/90.15
(Continued)

FOREIGN PATENT DOCUMENTS

EP    1 291 507 A2    3/2003
JP    8-260925 A     10/1996
(Continued)

OTHER PUBLICATIONS

International Search Report issued Apr. 24, 2012 in PCT/JP2012/057474.

*Primary Examiner* — Grant Moubry
(74) *Attorney, Agent, or Firm* — Oblon, McClelland, Maier & Neustadt, L.L.P.

(57) ABSTRACT

A variable valve device for an internal combustion engine is equipped with a variable valve mechanism capable of changing the working angle of an intake valve while holding the maximum lift amount of the intake valve constant. The variable valve device retards the timing for closing the intake valve as the load of the internal combustion engine rises, and enlarges the working angle, while holding the timing for opening the intake valve constant. Operating characteristics of the intake valve are provided in accordance with the load of the internal combustion engine.

9 Claims, 20 Drawing Sheets

(51) Int. Cl.
*F01L 13/00* (2006.01)
*F02B 31/00* (2006.01)
(52) U.S. Cl.
CPC ..... *F02D 13/0234* (2013.01); *F02D 41/0002* (2013.01); *F01L 2013/0073* (2013.01); *F02B 2031/006* (2013.01); *F02D 2041/001* (2013.01); *F02D 2041/0015* (2013.01); *Y02T 10/18* (2013.01); *Y02T 10/42* (2013.01)
(58) Field of Classification Search
USPC ............. 123/345, 346, 90.1; 701/103, 105
See application file for complete search history.

(56) References Cited

U.S. PATENT DOCUMENTS

| | | | | |
|---|---|---|---|---|
| 8,113,157 | B2* | 2/2012 | Nakamura | F01L 1/3442 123/348 |
| 8,401,721 | B2* | 3/2013 | Nakamura | F01L 1/3442 701/22 |
| 9,068,483 | B2* | 6/2015 | Nakamura | F01L 1/3442 |
| 2006/0090730 | A1 | 5/2006 | Yui | |
| 2008/0210195 | A1* | 9/2008 | Saruwatari | F02D 13/0226 123/299 |
| 2009/0007862 | A1* | 1/2009 | Nakamura | F01L 1/3442 123/90.12 |
| 2009/0159027 | A1* | 6/2009 | Nakamura | F01L 1/022 123/90.17 |

FOREIGN PATENT DOCUMENTS

| | | |
|---|---|---|
| JP | 2001263015 A * | 9/2001 |
| JP | 2004-353485 A | 12/2004 |
| JP | 2006-125346 A | 5/2006 |
| JP | 2006-336659 A | 12/2006 |
| JP | 2009-299655 A | 12/2009 |
| JP | 2010-121597 A | 6/2010 |
| JP | 2010-223097 A | 10/2010 |
| JP | 2010-236434 A | 10/2010 |

* cited by examiner

LIFT CURVE OF INTAKE VALVE (EMBODIMENT MODE)

LIFT CURVE OF INTAKE VALVE (COMPARATIVE MODE)

LIFT CURVE OF INTAKE VALVE (LOW LOAD)

LIFT CURVE OF INTAKE VALVE (HIGH LOAD)

RELATIONSHIP BETWEEN LOAD AND
TIMING FOR CLOSING INTAKE VALVE

RELATIONSHIP BETWEEN AVERAGE EFFECTIVE
PRESSURE AND ACCELERATOR OPENING DEGREE

TIMING FOR CLOSING INTAKE VALVE WITH
RESPECT TO ACCELERATOR OPENING DEGREE

FIG. 17
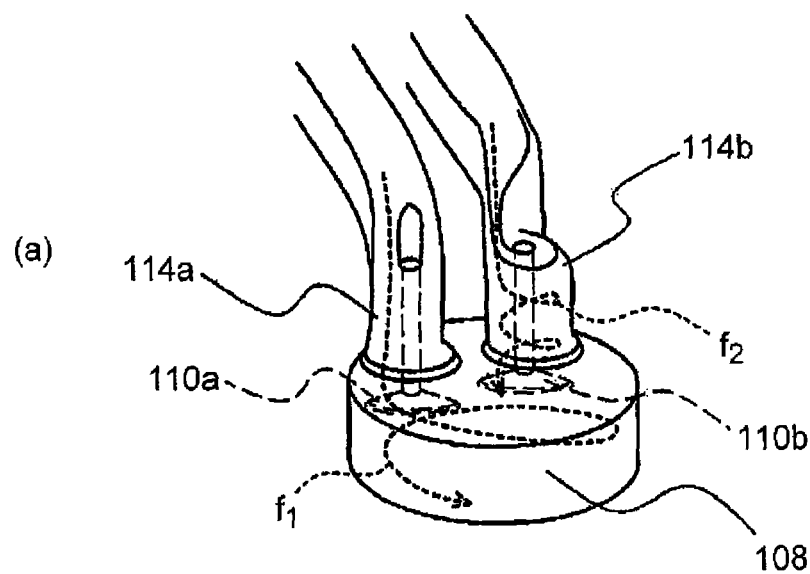
(a)
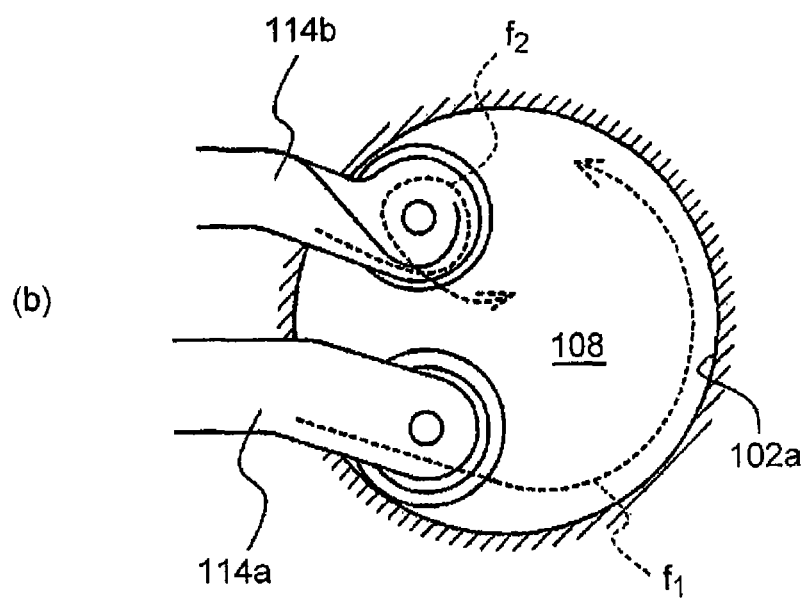
(b)

LIFT CURVE OF VALVE

SPEED OF PISTON AT TIME WHEN LIFT
AMOUNT IS MAXIMIZED, WITH RESPECT
TO TIMING FOR CLOSING VALVE

SWIRL RATIO WITH RESPECT TO
TIMING FOR CLOSING INTAKE VALVE

FIG. 21
(a)
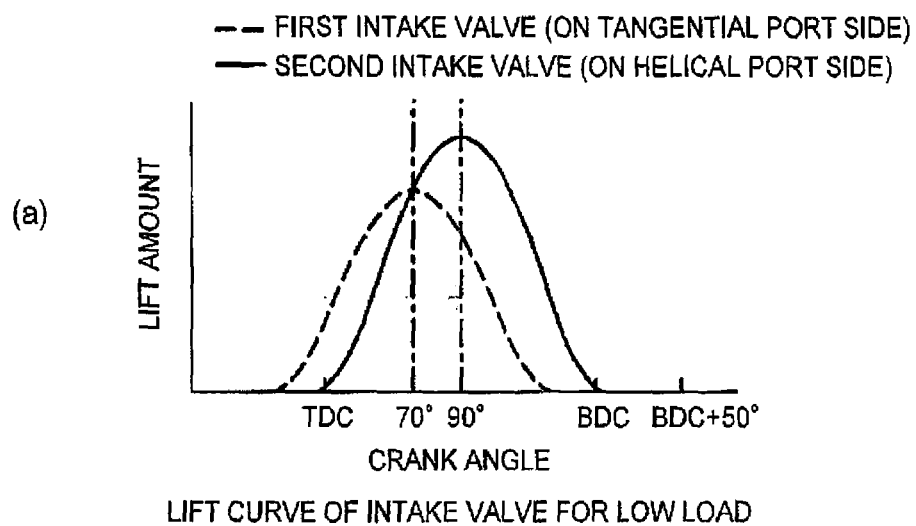
LIFT CURVE OF INTAKE VALVE FOR LOW LOAD
(b)
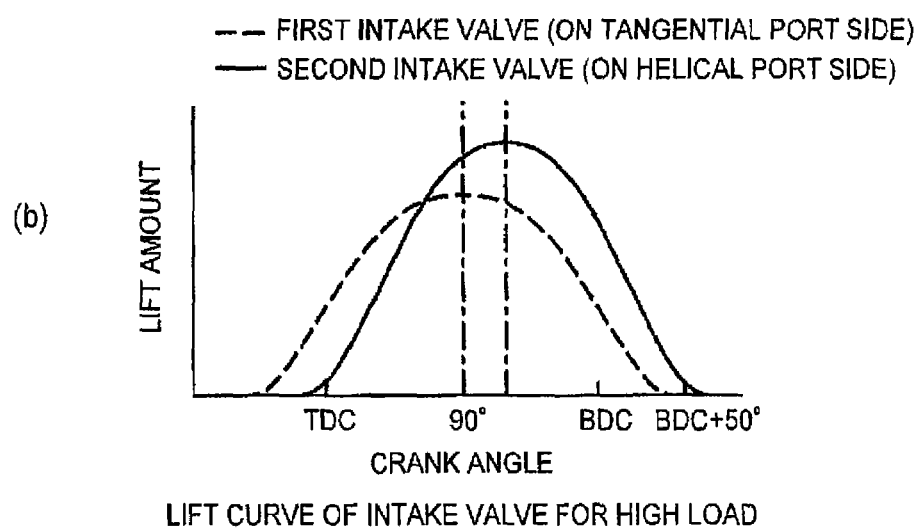
LIFT CURVE OF INTAKE VALVE FOR HIGH LOAD

SWIRL RATIO WITH RESPECT TO TIMING FOR
CLOSING SECOND INTAKE VALVE

FIG. 23
(a) 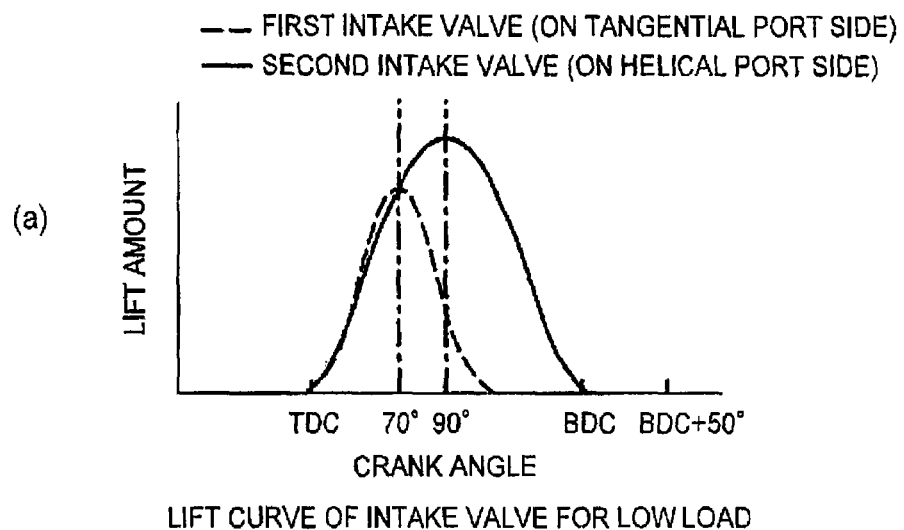
LIFT CURVE OF INTAKE VALVE FOR LOW LOAD
(b) 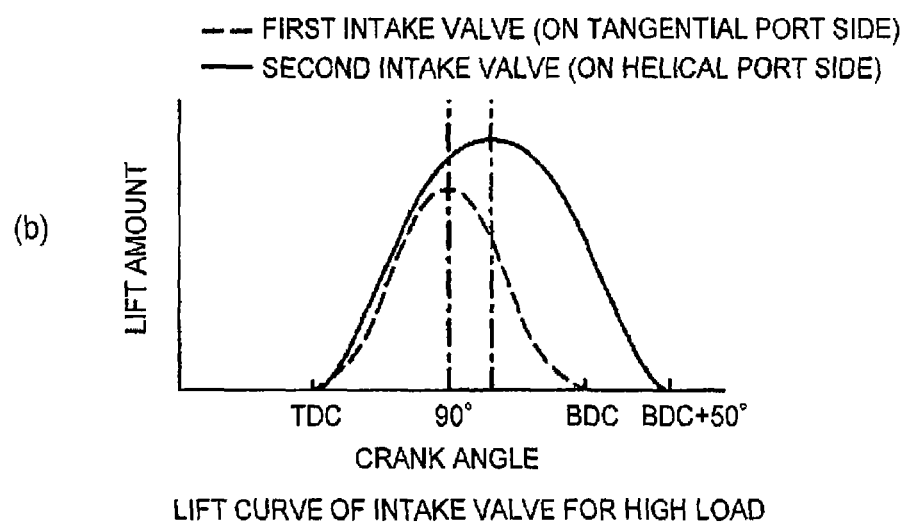
LIFT CURVE OF INTAKE VALVE FOR HIGH LOAD

FIG. 24
(a)
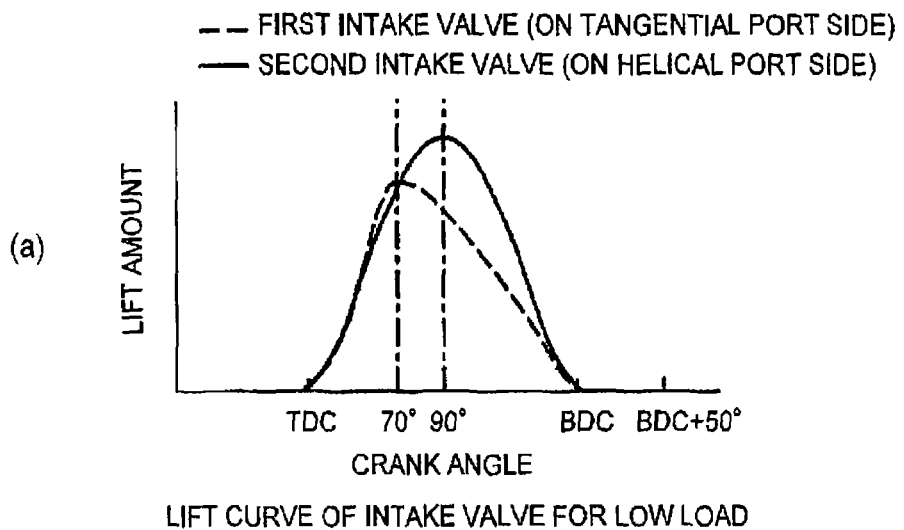
LIFT CURVE OF INTAKE VALVE FOR LOW LOAD
(b)
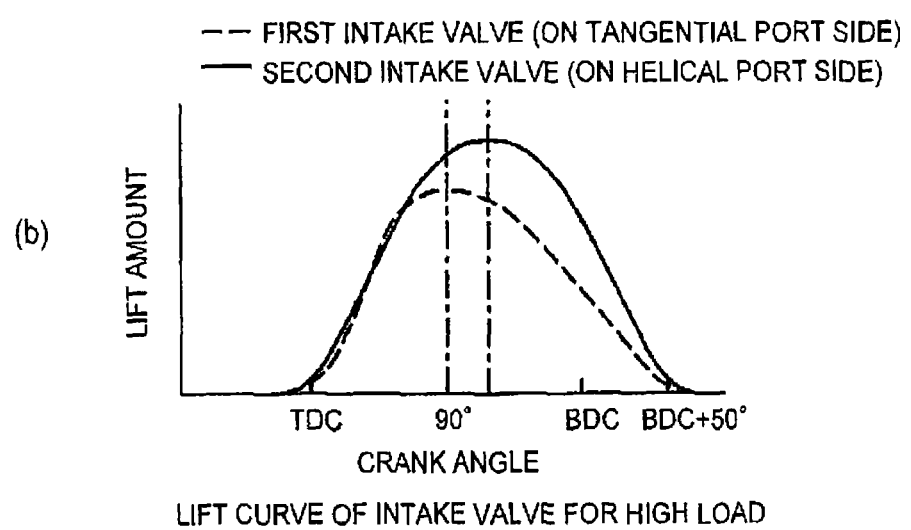
LIFT CURVE OF INTAKE VALVE FOR HIGH LOAD

SCV OPENING DEGREE WITH RESPECT TO
TIMING FOR CLOSING FIRST INTAKE VALVE

VARIABLE VALVE DEVICE OF INTERNAL COMBUSTION ENGINE

TECHNICAL FIELD

The invention relates to a variable valve device for an internal combustion engine.

BACKGROUND ART

A variable valve device for an internal combustion engine transmits a turning force from a main drive shaft (a crankshaft) of the internal combustion engine to a camshaft via a timing chain and a timing belt, and rotates cams provided on the camshaft, thereby causing the cams to act on intake and exhaust valves (valves) to open/close the valves.

In recent years, there have been known variable valve mechanisms that are designed to change the working angle of a valve by changing the period in which a cam acts on the valve. Patent Document 1 discloses a variable valve system for an internal combustion engine that changes the lift amount of a valve with respect to a rotational position of a cam and changes the working angle of the valve by rotating a control shaft that is interposed between the cam and the valve, with the aid of a drive source. Patent Document 2 discloses a variable valve device that changes the working angle of a valve by interposing an annular disc between a flange portion of a sleeve coupled to a drive shaft and a flange portion of a camshaft, and making the center of the annular disc eccentric to cause the annular disc to rotate at non-constant speed.

RELATED ART DOCUMENTS

Patent Documents

Patent Document 1: Japanese Patent Application Publication No. 2009-299655 (JP-2009-299655 A)
Patent Document 2: Japanese Patent Application Publication No. 2006-336659 (JP-2006-336659 A)

SUMMARY OF THE INVENTION

Problem to be Solved by the Invention

However, in the mechanism that changes the working angle of the valve by changing the lift amount as is the case with the variable valve system of Patent Document 1, the lift amount of the valve inevitably decreases if the working angle of the valve is reduced. In this case, the lift amount of the valve decreases, so a deterioration in intake efficiency is incurred and leads to misfire or a decrease in output.

By the way, there is a variable valve mechanism capable of changing the working angle of an intake valve while holding the maximum lift amount of the intake valve constant. The maximum lift amount means a maximum value of the lift amount from the opening of the intake valve to the closing of the intake valve, namely, the lift amount at a peak of a lift curve. In the variable valve mechanism capable of changing the working angle of the intake valve while holding the maximum lift amount of the intake valve constant, the lift amount of the valve is maintained even if the working angle of the valve is reduced. Thus, the fluctuation in the intake efficiency of the internal combustion engine is small when the working angle is changed. However, among such variable valve mechanisms that are able to change the working angle of the intake valve while holding the maximum lift amount of the intake valve constant, those which prescribe the valve characteristics corresponding to the state of the load of the internal combustion engine are still unknown.

It is thus an object of the invention to provide a variable valve device for an internal combustion engine that is equipped with a variable valve mechanism capable of changing the working angle of an intake valve while holding the maximum lift amount of the intake valve constant, and that drives the intake valve in accordance with the state of a load of the internal combustion engine.

Means for Solving the Problem

A variable valve device for an internal combustion engine according to the invention that solves this problem is characterized by being equipped with a variable valve mechanism capable of changing a working angle of an intake valve while holding a maximum lift amount of the intake valve constant, and retarding a timing for closing the intake valve as a load of the internal combustion engine rises and enlarging the working angle, while holding a timing for opening the intake valve constant. Thus, the variable valve device for the internal combustion engine that is equipped with the variable valve mechanism capable of changing the working angle of the intake valve while holding the maximum lift amount of the intake valve constant, and that drives the intake valve in accordance with the state of the load of the internal combustion engine is provided. Incidentally, the timing for opening the intake valve means a time point when the intake valve in its closed state starts opening, and the timing for closing the intake valve means a time point when the intake valve in its open state closes to block a flow channel.

The aforementioned variable valve device for the internal combustion engine may set the timing for closing the intake valve as a vicinity of a bottom dead center when the load of the internal combustion engine is low. Besides, the aforementioned variable valve device for the internal combustion engine may retard the timing for closing the intake valve with respect to the vicinity of the bottom dead center when the load of the internal combustion engine is high. Besides, the aforementioned variable valve device for the internal combustion engine may change the timing for closing the intake valve such that a volumetric efficiency is maximized, when the load of the internal combustion engine is intermediate.

Furthermore, the aforementioned variable valve device for the internal combustion engine may be equipped with a tangential port and a helical port through which intake air is supplied to a cylinder of the internal combustion engine. A maximum lift amount of a first intake valve that is provided in the tangential port may be smaller than a maximum lift amount of a second intake valve that is provided in the helical port. The aforementioned variable valve device for the internal combustion engine may change a timing for closing the first intake valve such that a crank angle at which a lift amount of the first intake valve is maximized becomes smaller than a crank angle at which a speed of a piston is maximized, when the load of the internal combustion engine is low.

Besides, the aforementioned variable valve device for the internal combustion engine may be equipped with a tangential port and a helical port through which intake air is supplied to a cylinder of the internal combustion engine. A maximum lift amount of a first intake valve that is provided in the tangential port may be smaller than a maximum lift amount of a second intake valve that is provided in the helical port. The aforementioned variable valve device for the internal combustion engine may change a timing for closing the first intake valve such that a crank angle at which a lift amount of the first intake valve is maximized becomes equal to a crank angle at which a speed of a piston is maximized, when the load of the Internal combustion engine is high.

In such a case, in the aforementioned variable valve device for the internal combustion engine, the second intake valve may perform an opening/closing operation of the aforementioned intake valve. Furthermore, the first intake valve may perform an opening/closing operation of the aforementioned intake valve.

Besides, in the aforementioned variable valve device for the internal combustion engine, the lift amount of the first intake valve may be set in such a manner as to be maximized in a first half of a valve-open period. In the aforementioned variable valve device for the internal combustion engine, the tangential port may be equipped with a swirl control valve that adjusts a swirl current.

Effect of the Invention

The invention can provide a variable valve device for an internal combustion engine that is equipped with a variable valve mechanism capable of changing the working angle of an intake valve while holding the maximum lift amount of the intake valve constant, and that drives the intake valve in accordance with the state of a load of the internal combustion engine.

BRIEF DESCRIPTION OF THE DRAWINGS

FIG. 6 (a) shows a position of the raceway surface in a reference state. FIG. 6 (b) shows a position of the raceway surface at a time when the guide member has moved upward with respect to the reference state. FIG. 6 (c) shows a position of the raceway surface at a time when the guide member has moved downward with respect to the reference state.

FIG. 8 (a) shows a state where the intake valve is closed. FIG. 8 (b) shows a state where the intake valve is open.

FIG. 9 (a) shows a state where the intake valve is closed. FIG. 9 (b) shows a state where the intake valve is open.

FIG. 11 (a) is a view showing the comparison as to the maximum lift amount of the intake valve. FIG. 11 (b) is a view showing the comparison as to a geometric volume in a cylinder at the timing for closing the intake valve. FIG. 11 (c) is a view showing the comparison as to a volumetric efficiency. FIG. 11 (d) is a view showing the comparison as to an actual compression ratio.

FIG. 17 is a view showing a first intake port and a second intake port of an internal combustion engine according to the second embodiment of the invention. FIG. 17 (a) is a perspective view of the first intake port and the second intake port. FIG. 17 (b) is a top view of the first intake port and the second intake port.

FIG. 21 is a view showing lift curves of a first intake valve and a second intake valve. FIG. 21 (a) shows the lift curves at a time when the load is low. FIG. 21 (b) shows the lift curves at a time when the load is high.

FIG. 23 is a view showing another example of the lift curves of the first intake valve and the second intake valve according to the second embodiment of the invention. FIG. 23 (a) shows the lift curves at a time when the load is low. FIG. 23 (b) shows the lift curves at a time when the load is high.

FIG. 24 is a view showing lift curves of a first intake valve and a second intake valve according to the third embodiment of the invention. FIG. 24 (a) shows the lift curves at a time when the load is low. FIG. 24 (b) shows the lift curves at a time when the load is high.

MODES FOR CARRYING OUT THE INVENTION

Hereinafter, the modes for carrying out the invention will be described in detail in conjunction with the drawings.

First Embodiment

Embodiment Mode

Figure 1:
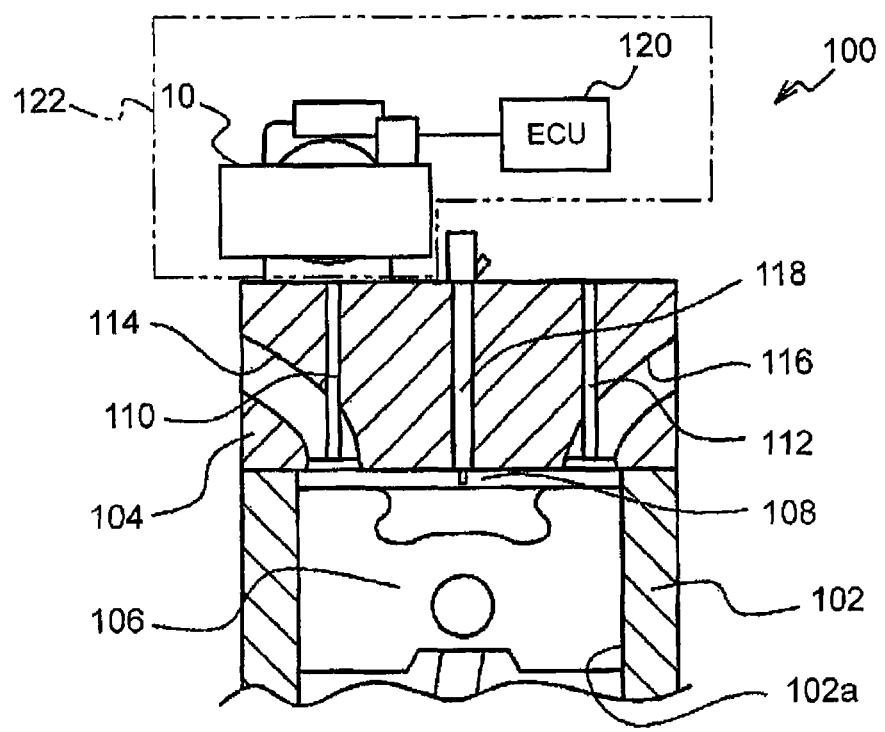
FIG. 1 is a view of an internal combustion engine according to an embodiment mode of the invention, as will be described as embodiments of the invention.

FIG. 1 is a view of an internal combustion engine 100 according to the embodiment mode of the invention, as will be described as the present embodiment of the invention. The internal combustion engine 100 is an in-line four-cylinder internal combustion engine that is equipped with four cylinders (#1 to #4). The four cylinders are configured in the same manner. FIG. 1 is a view showing one of the cylinders in cross-section. Incidentally, although the number of cylinders herein is four, any number of cylinders may be provided. As shown in FIG. 1, the internal combustion engine 100 is equipped with a cylinder block 102, a cylinder head 104, and a piston 106. The cylinder head 104 is provided on the cylinder block 102. The piston 106 is housed in the cylinder block 102 in such a manner as to be able to slide within a cylinder 102a that is formed in the cylinder block 102. A combustion chamber 108 is formed as a space that is surrounded by the cylinder block 102, the cylinder head 104, and the piston 106. Besides, the internal combustion engine 100 is equipped with an intake valve 110 and an exhaust valve 112 for each of the cylinders. Specifically, an intake port 114 that is provided with the intake valve 110, and an exhaust port 116 that is provided with the exhaust valve 112 are formed in the cylinder head 104. Besides, the cylinder head 104 is provided with a fuel injection valve 118 that injects fuel into the combustion chamber 108. Incidentally, the fuel injection valve 118 may be provided in such a manner as to inject fuel to the intake port 114 instead of injecting fuel into the combustion chamber 108. Furthermore, the internal combustion engine 100 is equipped with a variable valve device 122. The variable valve device 122 is equipped with a variable valve mechanism 10 and an electronic control unit (ECU) 120.

The variable valve mechanism 10 drives the intake valve 110. The variable valve mechanism 10 can change the working angle of the intake valve 110 while holding the maximum lift amount of the intake valve 110 constant. The variable valve mechanism 10 is controlled by the ECU 120. The ECU 120 is configured as a known digital computer having a bidirectional bus that connects a central processing unit (CPU), a random access memory (RAM), a read only memory (ROM) and input/output ports to one another. The ECU 120 exchanges signals with various sensors and actuators that are provided to control the internal combustion engine 100, thereby controlling the internal combustion engine. The ECU 120 performs the control regarding the driving of the intake valve 110 by the variable valve mechanism 10. In the present embodiment of the invention in particular, the ECU 120 performs the control regarding the change in the working angle of the intake valve 110. Incidentally, the internal combustion engine 100 is also equipped with a drive cam for driving the exhaust valve 112. However, this drive cam is not needed to explain the present embodiment of the invention, and hence is not depicted in FIG. 1. Besides, the description of this drive cam will also be omitted.

Figure 2:
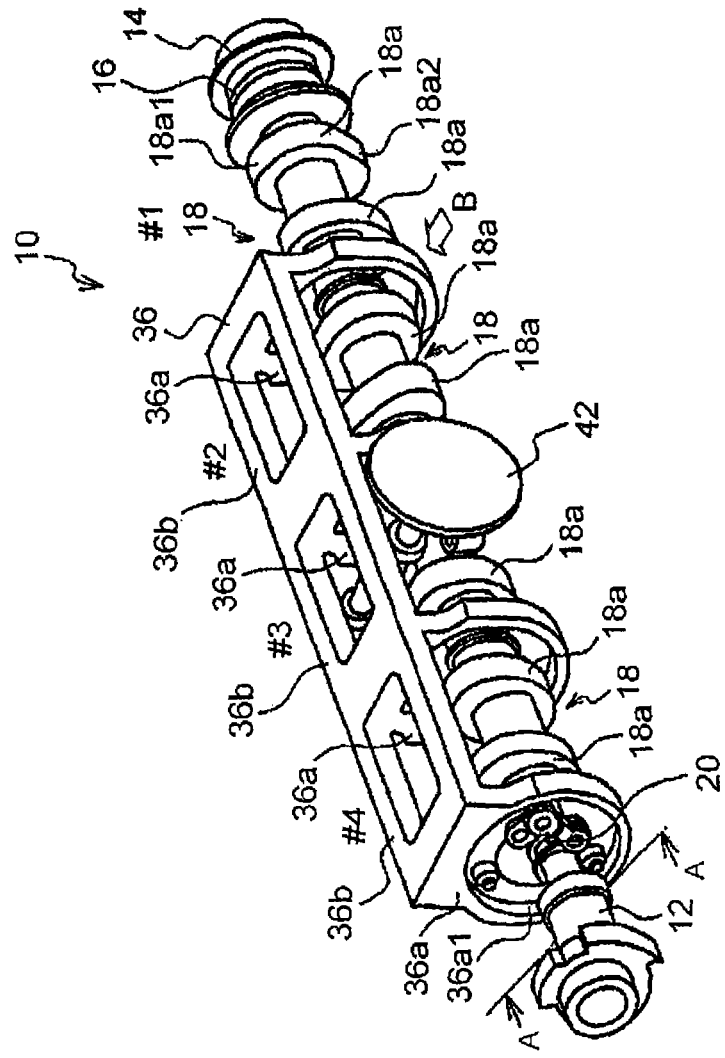
FIG. 2 is a perspective view of an overall configuration of a variable valve mechanism with which the internal combustion engine is equipped.
Figure 3:
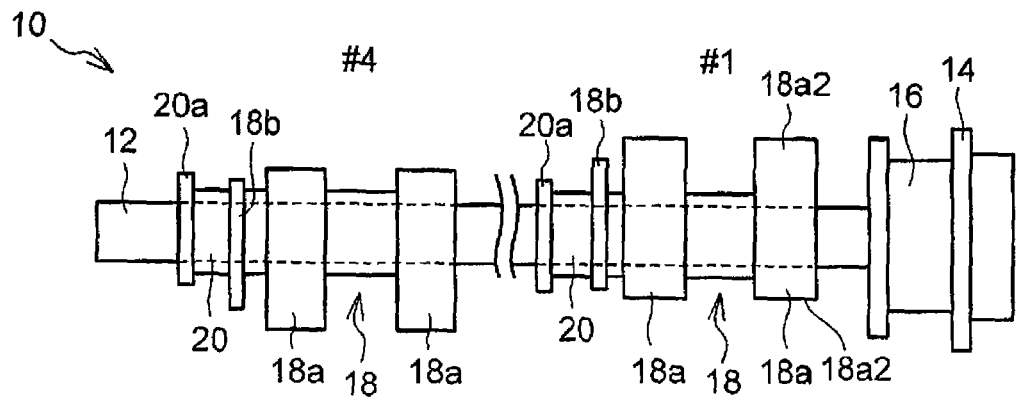
FIG. 3 is a view showing a configuration around a drive camshaft with which the variable valve mechanism shown in FIG. 2 is equipped.
Figure 4:
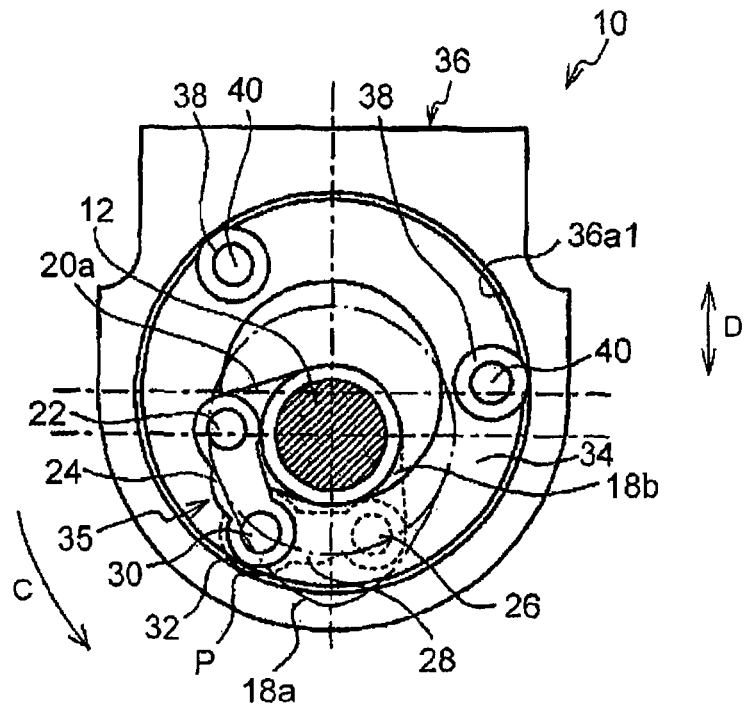
FIG. 4 is a cross-sectional view taken along a line A-A of FIG. 2.
Figure 5:
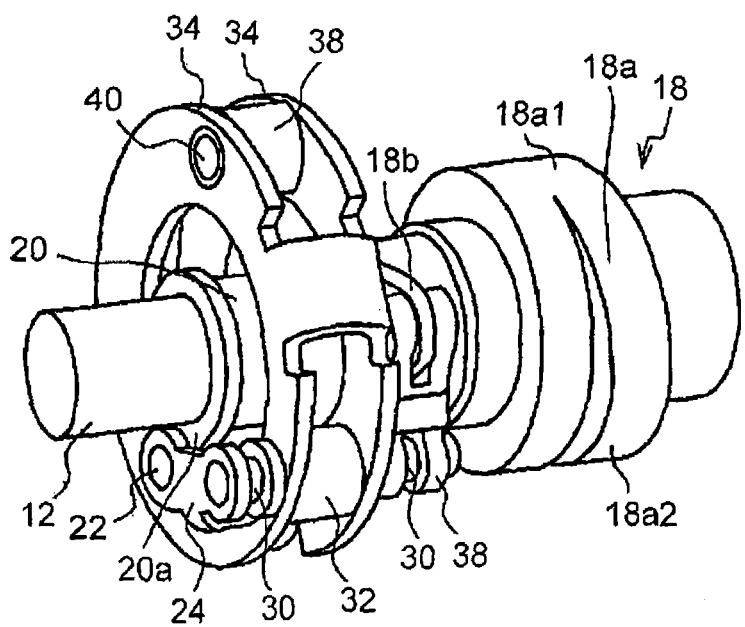
FIG. 5 is a view of the variable valve mechanism as viewed from a direction indicated by an arrow B in FIG. 2.

Hereinafter, the variable valve mechanism 10 will be described in detail with reference to FIGS. 2 to 6. FIG. 2 is a perspective view of an entire configuration of the variable valve mechanism 10. FIG. 3 is a view showing a configuration around a drive camshaft 12 with which the variable valve mechanism 10 shown in FIG. 2 is equipped. FIG. 4 is a cross-sectional view taken along a line A-A of FIG. 2. FIG. 5 is a view of the variable valve mechanism 10 as viewed from a direction indicated by an arrow B in FIG. 2. Incidentally, in FIG. 5, a guide member 36, which will be described later, is not shown.

As shown in FIGS. 2 and 3, the variable valve mechanism 10 is equipped with the drive camshaft 12. The drive camshaft 12 is coupled to a crankshaft (not shown) via a timing pulley 14 and a timing chain (not shown), and is configured to rotate at a speed of ½ of the crankshaft. As shown in FIG. 3, a variable valve timing (VVT) mechanism 16 capable of changing the rotational phase of the drive camshaft 12 with respect to rotation of the crankshaft is interposed between the drive camshaft 12 and the timing pulley 14.

As shown in FIGS. 2 and 3, the drive camshaft 12 is fitted with cam pieces 18 for cylinders respectively. The cam pieces 18 are concentric with the drive camshaft 12, and are rotatably supported by the drive camshaft 12. Two driven cam lobes 18a for driving valves (not shown) are formed on each of the cam pieces 18. Each of the driven cam lobes 18a is equipped with an arc-like base circle portion 18a1 that is concentric with the drive camshaft 12, and a nose portion 18a2 that is formed by protruding part of the base circle radially outward. A rocker arm (not shown) is provided for each intake valve 110 below each of the driven cam lobes 18a. The intake valve 110 is pushed out to be opened at a timing when the nose portion 18a2 of each of the driven cam lobes 18a comes into abutment on the rocker arm.

Besides, the drive camshaft 12 is fitted with drive arms 20 for the cylinders respectively. Each of the drive arms 20 has a drive arm portion 20a that protrudes radially outward of the drive camshaft 12. Each of the drive arms 20 is integrally fixed to the drive camshaft 12 through the use of a predetermined fixation member (not shown). Furthermore, a driven arm portion 18b, which protrudes radially outward of the drive camshaft 12, is formed integrally with each of the cam pieces 18, in the vicinity of the driven cam lobe 18a that is closer to the drive arm 20 for the same cylinder.

As shown in FIGS. 4 and 5, one end of a drive link 24 is rotatably coupled to the drive arm portion 20a via a camshaft-side rotary shaft 22. Besides, one end of a driven link 28 is rotatably coupled to the driven arm portion 18b via a cam lobe-side rotary shaft 26.

The other end of the drive link 24 and the other end of the driven link 28 are coupled to each other via a control roller-side rotary shaft 30. A control roller 32 and a link plate 34 are interposed between the drive link 24 and the driven link 28 on the control roller-side rotary shaft 30. In this manner, the variable valve mechanism 10 is equipped with the drive arm portion 20a and the driven arm portions 18b, which have an axial center of the drive camshaft 12 as a common rotation center, and a link mechanism 35 that is coupled by the drive link 24 and the driven link 28. The link mechanism 35 is a four-node link. Besides, as shown in FIG. 4, in the present embodiment mode of the invention, the driven link 28 is arranged in front of the drive link 24 in a rotational direction C of the drive camshaft 12, with the control roller 32 interposed between the driven link 28 and the drive link 24.

As shown in FIG. 5, the link plate 34 is molded by bending two annularly formed plate portions concentrically with each other. Then, the link plate 34 is arranged such that the drive camshaft 12 penetrates the inside thereof. Furthermore, the link plate 34 is arranged on the control roller-side rotary shaft 30 with the two plate portions of the link plate 34 sandwiching the control roller 32.

As shown in FIG. 4, a raceway surface 36a1 of the guide member 36 is arranged on an outer peripheral side of the link plate 34, in such a manner as to cover the link plate 34. This raceway surface 36a1 is constituted by a circumferential surface. Besides, the control roller 32 is rotatably supported by the control roller-side rotary shaft 30 at a position (a tangent point P) that is in contact with the raceway surface 36a1. Thus, the control roller 32 moves while rolling along the raceway surface 36a1, in such a manner as to interlock with rotation of the drive camshaft 12.

Furthermore, as shown in FIG. 4, two retention rollers 38 as well as the control roller 32 are rotatably fitted between the plate portions of the link plate 34 via retention rotary shafts 40, at positions that are in contact with the raceway surface 36a1. Owing to this configuration, the position of the link plate 34 in the radial direction of the drive camshaft 12 is defined by the raceway surface 36a1. Besides, the position of the control roller 32, which is fitted to the link plate 34, on the raceway surface 36a1 is defined. Thus, the control roller 32 moves while rolling on the raceway surface 36a1 constantly in contact with the raceway surface 36a1, as the drive camshaft 12 rotates. Then, as a result of the definition of the position of the control roller 32, the relative position between the driven cam lobes 18a, which are coupled to each other via the drive link 24 and the driven link 28, in the rotational direction is defined.

Besides, as shown in FIG. 2, the guide member 36 is equipped with annular portions 36a for the cylinders respectively. Each of the annular portions 36a has the raceway surface 36a1. The annular portions 36a of the respective cylinders are integrally coupled to one another by being bridged by bridge portions 36b. Incidentally, the guide member 36 is supported by the cylinder head 104 via a predetermined support member (not shown). Thus, the guide member 36 is configured to be movable in a direction indicated by an arrow D in FIG. 4 (which coincides with an axial direction of the cylinders of the internal combustion engine 100), and is bound in a direction perpendicular to the direction indicated by the arrow D.

Furthermore, as shown in FIG. 2, the variable valve mechanism 10 is equipped with an actuator 42. The actuator 42 moves the guide member 36 in the direction indicated by the arrow D in FIG. 4, within a predetermined moving range. More specifically, the actuator 42 moves the guide member 36 such that a center point of the raceway surface 36a1 as the circumferential surface moves along a direction normal to the axis of the drive camshaft 12 and the axial direction of the cylinders. At this time, a state where the center point of the raceway surface 36a1 and a center point of the drive camshaft 12 coincide with each other as viewed from the axial direction of the drive camshaft 12 is regarded as "a reference state". The actuator 42 adjusts the movement of the guide member 36 to an arbitrary position within the moving range. The actuator 42 moves the guide member 36 on the basis of a command of the ECU 120. The actuator 42 may be configured by combining, for example, a motor, a worm gear with each other.

Figure 6:
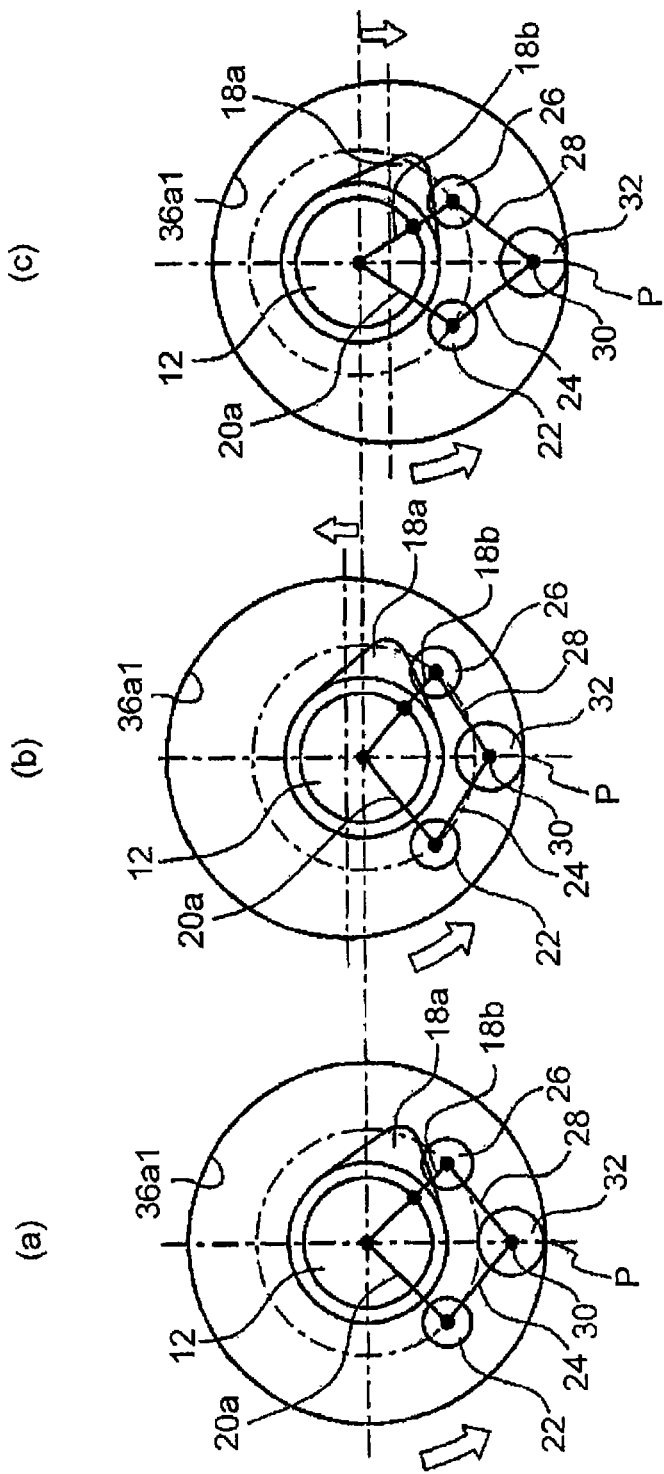
FIG. 6 is a view showing how a raceway surface of a guide member has been displaced.

Next, it will be described how the moving speed of each of the driven cam lobes 18a and the working angle of the intake valve 110 change as a result of the movement of the guide member 36. FIG. 6 is a view showing how the raceway surface 36a1 of the guide member 36 has been displaced. FIG. 6 (a) shows a position of the raceway surface 36a1 in the reference state. FIG. 6 (b) shows a position of the raceway surface 36a1 at a time when the guide member 36 has moved upward with respect to the reference state. FIG. 6 (c) shows a position of the raceway surface 36a1 at a time when the guide member 36 has moved downward with respect to the reference state.

When the drive camshaft 12 rotates in the rotational direction of the drive camshaft 12, a turning force of the drive camshaft 12 is transmitted to the drive link 24 via the drive arm portion 20a that is integrally fixed to the drive camshaft 12. The turning force of the drive camshaft 12, which has been transmitted to the drive link 24, is transmitted to the driven cam lobe 18a that is formed integrally with the driven arm portion 18b, via the control roller-side rotary shaft 30 and the driven link 28. In this manner, the turning force of the drive camshaft 12 is transmitted to the driven cam lobe 18a via the link mechanism 35.

As a result, the respective elements of the link mechanism 35 and the driven cam lobe 18a rotate in the same direction as the drive camshaft 12, in synchronization with rotation of the drive camshaft 12. In this case, the control roller 32 moves while rolling on the raceway surface 36a1 constantly in contact with the raceway surface 36a1 at the tangent point P, and rotates around the drive camshaft 12.

As shown in FIG. 6 (a), in the reference state, the center point of the drive camshaft 12 and the center point of the raceway surface 36a1 coincide with each other. Thus, while the control roller 32 rotates on the raceway surface 36a1 as the drive camshaft 12 rotates, a rotation center of the drive camshaft 12 and a rotation center of the control roller 32 coincide with each other. That is, in the reference state, the driven cam lobe 18a rotates at a speed equal to that of the drive camshaft 12.

The state shown in FIG. 6 (b) shows a state where the raceway surface 36a1 has moved upward (away from the combustion chamber 108). In this state, almost in a lower-half section of the raceway surface 36a1, as the control roller 32 moves toward a position $P_0$ directly below the raceway surface 36a1, the distance between the rotation center of the drive camshaft 12 and the rotation center of the control roller 32 is narrowed with respect to the aforementioned reference state. As a result, the cam lobe-side rotary shaft 26 moves forward in the rotational direction with respect to the reference state. Thus, the driven arm portion 18b moves faster than the drive arm portion 20a. That is, when the control roller 32 passes a lower semicircle of the raceway surface 36a1, the moving speed of the driven cam lobe 18a increases.

Conversely, the state shown in FIG. 6 (c) shows a state where the raceway surface 36a1 has moved downward (toward the combustion chamber 108). In this state, almost in the lower-half section of the raceway surface. 36a1, as the control roller 32 moves toward the position $P_0$ directly below the raceway surface 36a1, the distance between the rotation center of the drive camshaft 12 and the rotation center of the control roller 32 is widened with respect to the aforementioned reference state. As a result, the cam lobe-side rotary shaft 26 moves backward in the rotational direction with respect to the reference state. Thus, the driven arm portion 18b moves more slowly than the drive arm portion 20a. That is, when the control roller 32 passes the lower semicircle of the raceway surface 36a1, the moving speed of the driven cam lobe 18a decreases. In this manner, by appropriately controlling the position of the raceway surface 36a1, the moving speed of the driven cam lobe 18a (i.e., the cam piece 18) during one turn can be changed.

Figure 7:
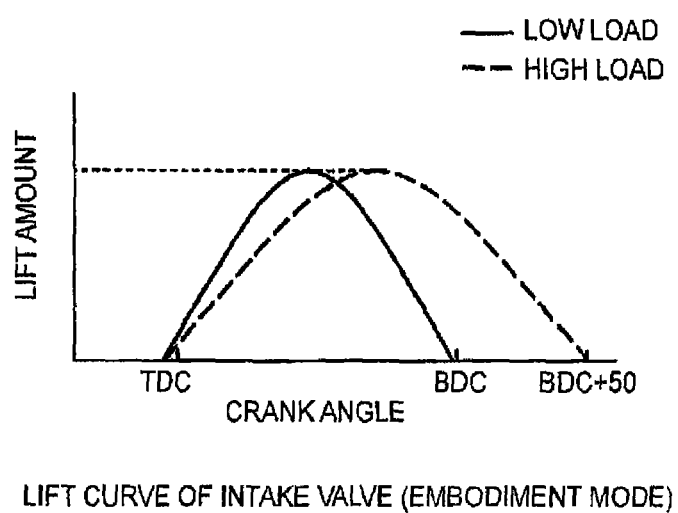
FIG. 7 is a view showing a lift curve of a first intake valve in the embodiment mode of the invention.

A relationship between the rotational speed of the cam piece 18 and the lift of the intake valve 110 will be described herein. FIG. 7 is a view showing a lift curve of the intake valve 110 in the present embodiment mode of the invention. A solid line in the drawing indicates a lift curve in the case where the working angle is reduced, and a broken line indicates a lift curve in the case where the working angle is increased.

The variable valve mechanism 10 changes the rotational speed of each of the cam pieces 18 during one turn of that cam piece 18, thereby making it possible to change the working angle of the intake valve 110 (a time from the opening of the valve to the closing of the valve). That is, if the rotational speed of the cam piece 18 is increased in a period in which the nose portion 18a2 of the cam piece 18 acts on the intake valve 110, the working angle of the intake valve 110 decreases. On the contrary, if the rotational speed of the cam piece 18 is reduced in a period in which the nose portion 18a2 acts on the intake valve 110, the working angle of the intake valve 110 increases. While the working angle of the intake valve is changed, the cam lift of the nose portion 18a2 of the cam piece 18 that acts on the intake valve 110 does not change, so the maximum lift amount of the intake valve 110 does not change. That is, as shown in FIG. 7, the variable valve mechanism 10 can change the working angle of the intake valve 110 while holding the maximum lift amount of the intake valve 110 constant. Incidentally, the variable valve mechanism 10 may change the timing for opening the intake valve 110 and the timing for closing the intake valve 110 by the VVT 16, without changing the lift curve. Incidentally, the timing for opening the intake valve 110 means a time point when the intake valve in its closed state starts opening, and the timing for closing the intake valve 110 means a time point when the intake valve in its open state closes to block a flow channel.

(Comparative Mode)

Figure 8:
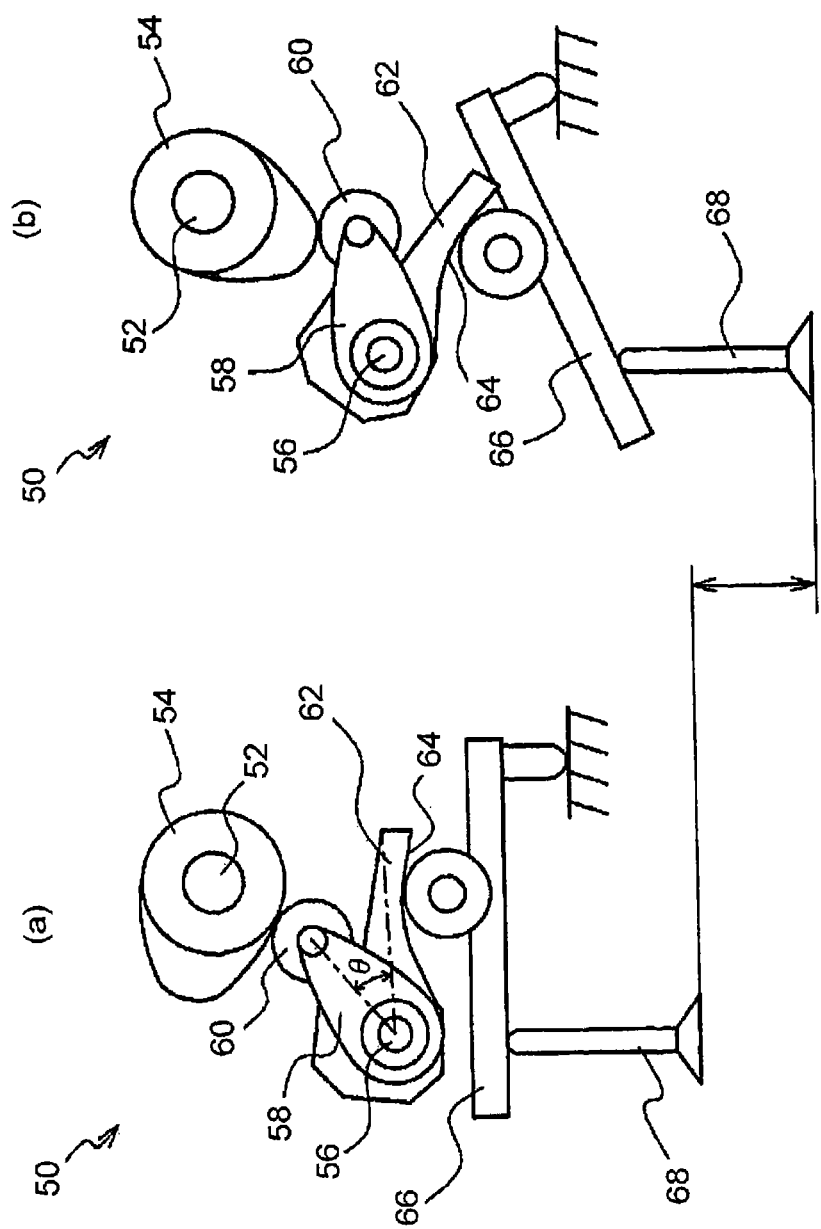
FIG. 8 is a view showing the outline of a variable valve mechanism at a time when a lift amount of an intake valve is reduced in a comparative mode of the invention.
Figure 9:
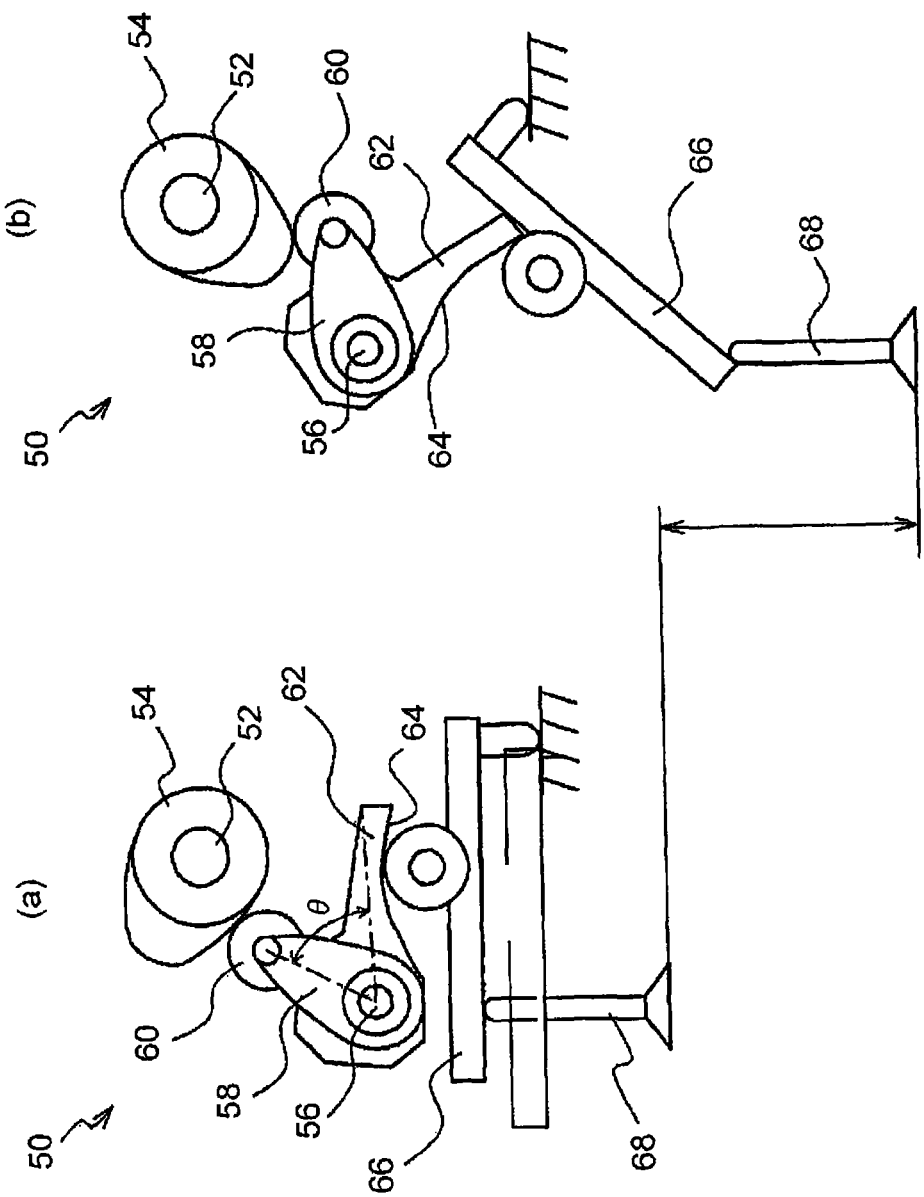
FIG. 9 is a view showing the outline of the variable valve mechanism at a time when the lift amount of the intake valve is increased in the comparative mode of the invention.
Figure 10:
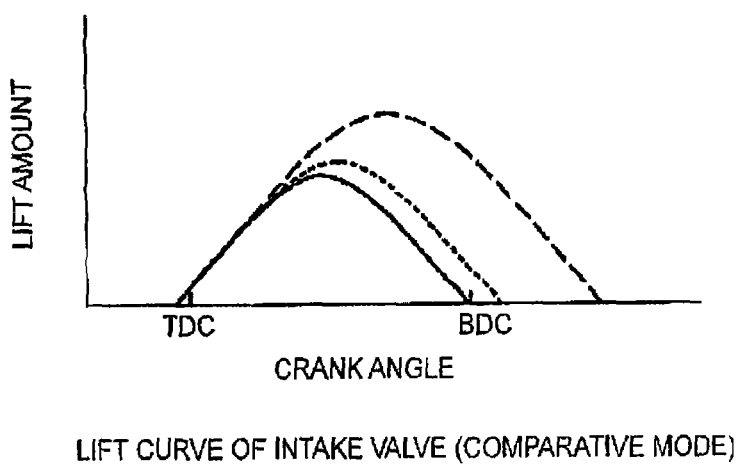
FIG. 10 is a view showing a lift curve in a case where the lift amount of the intake valve of the variable valve mechanism is changed in the comparative mode of the invention.

Next, a variable valve mechanism 50 according to a comparative mode of the invention will be described. The variable valve mechanism 50 according to the comparative mode of the Invention is a mechanism that changes the working angle of a valve by changing the lift amount of the valve. As described above, the variable valve mechanism 50 according to the comparative mode of the invention can be mounted on the internal combustion engine 100 described in the embodiment mode of the invention. FIGS. 8 and 9 are views showing the outline of the variable valve mechanism 50 according to the comparative mode of the invention. FIG. 8 shows a configuration at a time when the lift amount of an intake valve 68 is reduced. FIG. 9 shows a configuration at a time when the lift amount of the intake valve 68 is increased. Both FIG. 8 (a) and FIG. 9 (a) show a state where the intake valve 68 is closed, and both FIG. 8 (b) and FIG. 9 (b) show a state where the intake valve 68 is open. FIG. 10 is a view showing a lift curve in the case where the lift amount of the intake valve 68 by the variable valve mechanism 50 is changed. A dotted line in FIG. 10 indicates the lift curve of the intake valve in the reference state, a solid line in FIG. 10 indicates a case where the lift amount of the intake valve 68 is reduced, and a broken line in FIG. 10 indicates a case where the lift amount of the intake valve 68 is increased.

The variable valve mechanism 50 is equipped with a camshaft 52, a control shaft 56, and a rocker arm 66. The camshaft 52 is a shaft that is coupled to a crankshaft (not shown) of the internal combustion engine via a timing pulley (not shown), a timing chain (not shown) and the like and rotates. The camshaft 52 is provided with cams 54 for the cylinders respectively. The control shaft 56 is a shaft that is provided parallel to the camshaft 52. The control shaft 56 is provided with roller arms 58 and rocking arms 62 for the cylinders respectively. A main roller 60 is provided at a tip of each of the roller arms 58. The camshaft 52 and the control shaft 56 are arranged such that the main rollers 60 are in contact with the cams 54 respectively. The roller arms 58 and the rocking arms 62 are provided on the control shaft 56 such that the relative position thereof around the control shaft 56 can be changed. The control shaft 56 is provided with rotation means (not shown) for rotating the roller arms 58 relatively to the rocking arms 62 respectively. Besides, the rocking arms 62 have slide surfaces 64 that are in contact with rocker arms 66 respectively. Each of the rocker arms 66 is configured to rotate upon receiving a force from a corresponding one of the rocking arms 62, and to drive the intake valve 68.

Next, the operation of opening the intake valve 68 by the variable valve mechanism 50 will be described. When the camshaft 52 rotates, the main rollers 60 are pushed in accordance with rotation of the camshaft 52, and the roller arms 58 rotate. Due to rotation of the roller arms 58, the control shaft 56 and the rocking arms 62 that are provided on the control shaft 56 rotate. The rocking arms 62 rotate and act on the rocker arms 66 respectively, so each of the rocker arms 66 rotates to open the intake valve 68.

Next, the operation in a case where the variable valve mechanism 50 changes the lift amount of the intake valve 68 will be described. In the case of changing the lift amount of the intake valve 68, the variable valve mechanism 50 rotates the roller arms 58 to change an angle θ formed by each of the roller arms 58 and a corresponding one of the rocking arms 62. It is assumed herein that the timing for opening the intake valve 68 is not changed. For example, if the angle θ formed by the roller arm 58 and the rocking arm 62 is narrowed, the lift amount of the intake valve 68 decreases as indicated by the solid line in FIG. 10. Besides, as soon as the lift amount decreases, the timing for closing the intake valve 68 is advanced, and the working angle of the intake valve 68 decreases. On the contrary, if the angle θ formed by the roller arm 58 and the rocking arm 62 is widened, the lift amount of the intake valve 68 increases as indicated by the broken line in FIG. 10. Besides, as soon as the lift amount increases, the timing for closing the intake valve 68 is retarded, and the working angle of the intake valve 68 increases. As described above, the variable valve mechanism 50 according to the comparative mode of the invention changes the working angle of the intake valve 68 by changing the lift amount of the intake valve 68.

(As for Valve Characteristics of Embodiment Mode)

Figure 11:
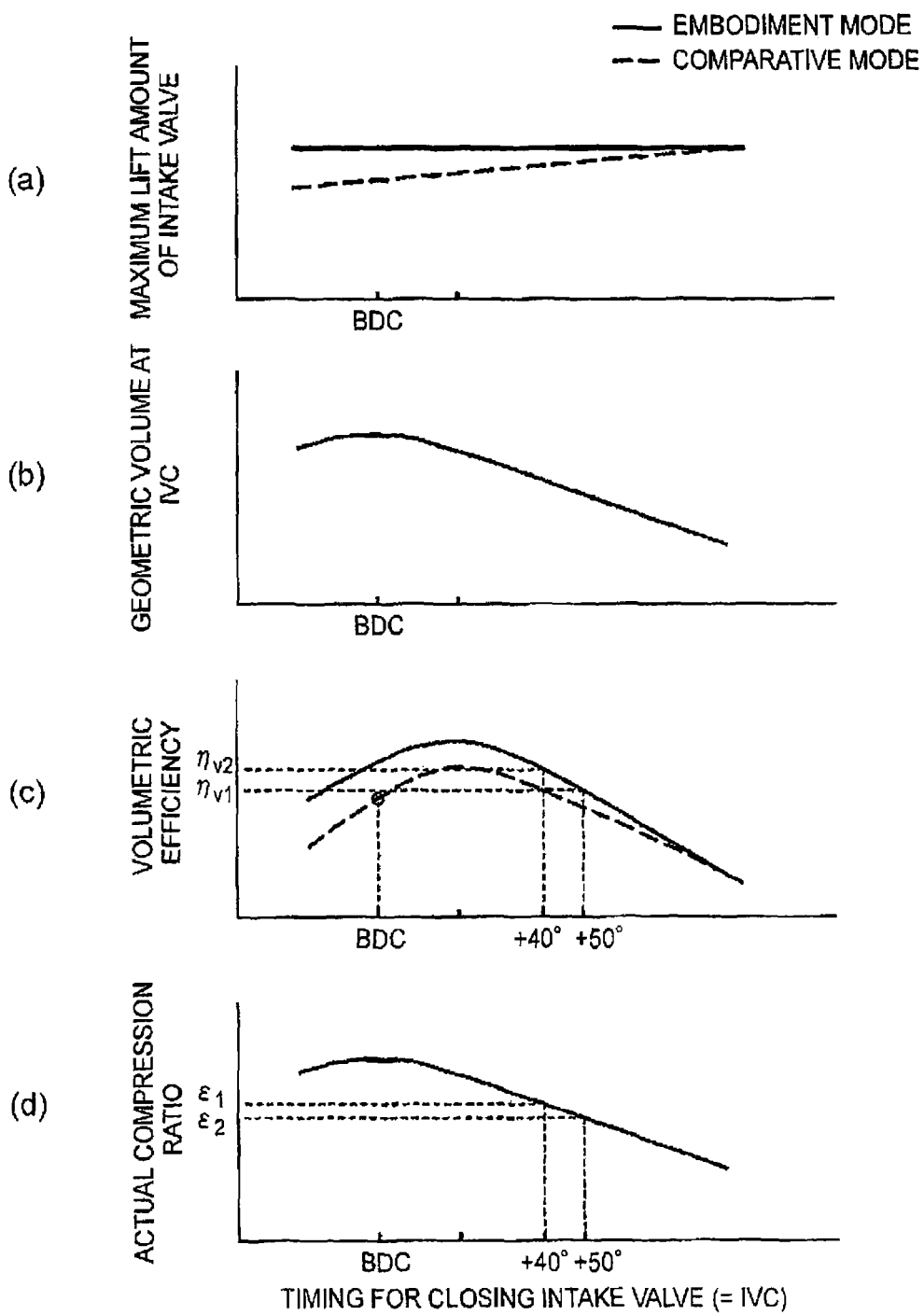
FIG. 11 is a view making a comparison between the embodiment mode of the invention and the comparative mode of the invention as to changes in the specification of the internal combustion engine with respect to a timing for closing the intake valve.
Figure 12:
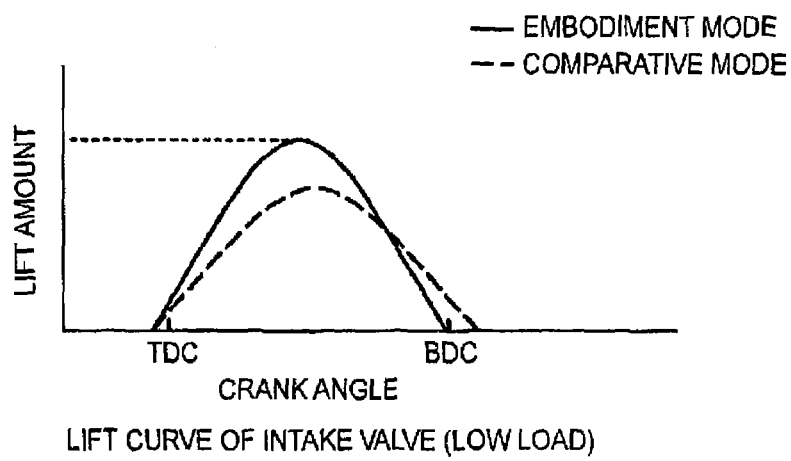
FIG. 12 is a view making a comparison between the lift curve of the intake valve according to the embodiment mode of the invention and the lift curve of the intake valve according to the comparative mode of the invention during low-load operation.
Figure 13:
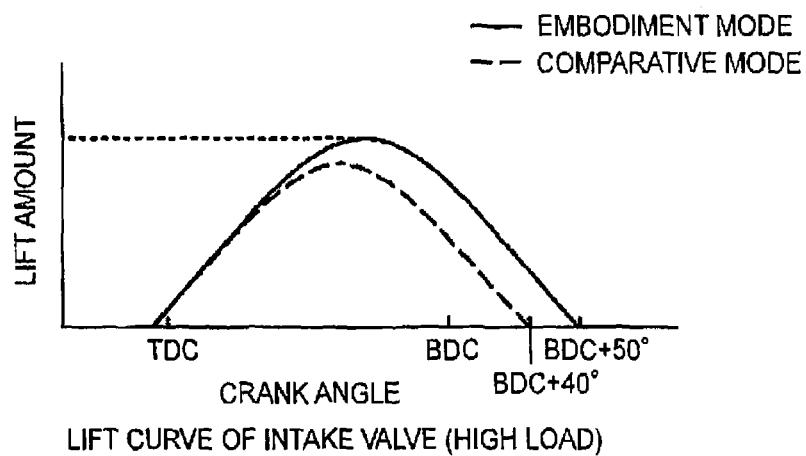
FIG. 13 is a view making a comparison between the lift curve of the intake valve according to the embodiment mode of the invention and the lift curve of the intake valve according to the comparative mode of the invention during high-load operation.

Next, the valve characteristics of the variable valve device 122 in the embodiment mode of the invention will be described, while making a comparison between the embodiment mode of the invention and the comparative mode of the invention. FIG. 11 is a view making a comparison between the embodiment mode of the invention and the comparative mode of the invention as to changes in the specification of the internal combustion engine 100 with respect to the timings for closing the intake valves 110 and 68. FIG. 11 (a) is a view showing the comparison as to the maximum lift amounts of the intake valves 110 and 68. FIG. 11 (b) is a view showing the comparison as to a geometric volume in each cylinder, which is defined by the cylinder block 102, the cylinder head 104, and the piston 106, at the timings (IVC) for closing the intake valves 110 and 68. FIG. 11 (*c*) is a view showing the comparison as to a volumetric efficiency. FIG. 11 (*d*) is a view showing the comparison as to an actual compression ratio. In each of FIGS. 11 (*a*) to 11 (*d*), a solid line indicates a value in the embodiment mode of the invention, and a broken line indicates a value in the comparative mode of the invention. In each of FIGS. 11 (*b*) and 11 (*d*), since the value in the embodiment mode of the invention and the value in the comparative mode of the invention are equal to each other, no broken line is depicted. FIG. 12 is a view making a comparison between the lift curve of the intake valve 110 according to the embodiment mode of the invention and the lift curve of the intake valve 68 according to the comparative mode of the invention during low-load operation. FIG. 13 is a view making a comparison between the lift curve of the intake valve according to the embodiment mode of the invention and the lift curve of the intake valve according to the comparative mode of the invention during high-load operation.

The embodiment mode of the invention is configured such that the maximum lift amount of the intake valve 110 coincides with a maximum lift amount at a time when the lift amount of the intake valve 68 is maximized in the comparative mode of the invention. Accordingly, as shown in FIG. 11 (*a*), the maximum lift amount of the intake valve in the embodiment mode of the invention is always equal to or larger than the maximum lift amount of the intake valve according to the comparative mode of the invention, independently of the timing for closing the intake valve.

Generally, in the internal combustion engine, the amount of intake air required during low-load operation is small, and the amount of intake air required during high-load operation is large. In the internal combustion engine that makes it possible to change the working angle of the intake valve, the amount of intake air that can be taken into the combustion chamber is increased by enlarging the working angle of the intake valve. Thus, the internal combustion engine 100 requires valve characteristics in which the working angle of the intake valve 110 or 68 is reduced during low-load operation and the working angle of the intake valve 110 or 68 is enlarged during high-load operation. In this case, as a prerequisite, the timing for opening the intake valve 110 or 68 is constant regardless of the load of the internal combustion engine 100. More specifically, the timing for opening the intake valve 110 or 68 is set as the vicinity of a top dead center (TDC). Accordingly, in the case where the working angle is enlarged, the timing for closing the intake valve 110 or 68 is made later (retarded).

In general, during low-load operation of the internal combustion engine, the amount of fuel supplied into the cylinders is small, so a fluctuation in the actual compression ratio of the internal combustion engine leads to a fluctuation in combustion. Besides, due to the structure of the internal combustion engine, if the working angle of the intake valve changes as a result of manufacturing variability and aged deterioration, the actual compression ratio fluctuates. For example, if the actual compression ratio decreases when the load is low, the amount of air taken into the cylinders decreases to possibly cause misfire or a decrease in output.

By the way, the actual compression ratio is obtained by dividing the volume of the combustion chamber during compression by the volume of the combustion chamber at the timing for closing the intake valve. Since the volume of the combustion chamber during compression is constant, the actual compression ratio depends on the volume of the combustion chamber at the timing for closing the intake valve. Thus, as shown in FIGS. 11 (*b*) and 11 (*d*), the actual compression ratio changes in the same manner as the geometric volume in the cylinder 102*a* that is defined by the cylinder block 102, the cylinder head 104, and the piston 106 at the timing (IVC) for closing the intake valve. The geometric volume in the cylinder 102*a* is maximized and the fluctuation in the geometric volume is also small in the case where the piston is located at a bottom dead center (BDC). Accordingly, as shown in FIG. 11 (*d*), the fluctuation in the actual compression ratio is also minimized in the vicinity of the bottom dead center (BDC) of the piston.

Due to the above reason, during low-load operation in which the actual compression ratio is desired to be restrained from fluctuating, it is preferable to close the intake valve in the vicinity of the bottom dead center. By the way, in the case where the working angle of the valve is changed by changing the lift amount of the valve as is the case with the variable valve mechanism 50 according to the comparative mode of the invention, when the working angle of the intake valve 68 is reduced during low-load operation, the lift amount of the intake valve 68 inevitably decreases. Thus, in the comparative mode of the invention, if the intake valve 68 is set so as to be closed in the vicinity of the bottom dead center, a deterioration in intake efficiency is caused. As a result, as shown in FIG. 11 (*c*), the volumetric efficiency in the vicinity of the bottom dead center greatly decreases. Accordingly, it is not preferable to close the intake valve 68 in the vicinity of the bottom dead center by the variable valve mechanism 50 according to the comparative mode of the invention.

In contrast, the variable valve device 122 according to the embodiment mode of the invention does not cause a decrease in the maximum lift amount of the intake valve 110 even if the timing for closing the intake valve 110 is set as the vicinity of the bottom dead center. Thus, the variable valve device 122 according to the embodiment mode of the invention makes it possible to obtain higher volumetric efficiency than in the case of the comparative mode of the invention. This is because the variable valve device 122 according to the embodiment mode of the invention can change the working angle of the intake valve 110 while holding the maximum lift amount of the intake valve 110 constant. Since the volumetric efficiency can thus be restrained from decreasing, the variable valve device 122 according to the embodiment mode of the invention allows the intake valve 110 to be closed in the vicinity of the bottom dead center. As a result, even in the case where the working angle of the intake valve 110 has changed due to manufacturing variability or aged deterioration, the fluctuation in the actual compression ratio resulting from a change in the working angle can be reduced, and a stable combustion state can be realized.

For the above reason, the variable valve device 122 for the internal combustion engine 100 according to the present embodiment mode of the invention sets the timing for closing the intake valve 110 as the vicinity of the bottom dead center when the load is low. Specifically, it is preferable that the timing for closing the intake valve 110 be within 10° CA before and after the bottom dead center (BDC±10° CA).

On the contrary, during high-load operation of the internal combustion engine, it is preferable to reduce the actual compression ratio to curb the generation of smoke. As is apparent from FIG. 11 (*d*), at and after a certain angle past the bottom dead center, the actual compression ratio decreases as the timing for closing the intake valve is retarded. Thus, it is preferable to retard the timing for closing the intake valve to a maximum possible extent during high-load operation. However, as shown in FIG. 11 (c), the volumetric efficiency decreases as the timing for closing the intake valve 110 or 68 is retarded, so the output decreases despite high-load operation. Accordingly, the timing for closing the intake valve 110 or 68 must not drop below a required volumetric efficiency $\eta_{v1}$ during high-load operation. It is apparent from FIG. 11 (c) that the timing for closing the intake valve to realize the required volumetric efficiency $\eta_{v1}$ during high-load operation is later in the embodiment mode of the invention than in the comparative mode of the invention (the comparative mode of the invention: ABDC 40° CA, the embodiment mode of the invention: ABDC 50° CA). In consequence, as is apparent from FIG. 11 (d), the actual compression ratio can be made lower in the embodiment mode of the invention than in the comparative mode of the invention ($\epsilon_1 > 52$). As a result, the variable valve device 122 according to the embodiment mode of the invention can curb the generation of smoke in the internal combustion engine 100. Besides, if the same generation amount of smoke as in the comparative mode of the invention is allowed in the embodiment mode of the invention, the actual compression ratio can be raised from $\epsilon_2$ to $\epsilon_1$. The volumetric efficiency in the embodiment mode of the invention can be raised to $\eta_{v2}$ accordingly. Therefore, the embodiment mode of the invention makes it possible to raise the output of the internal combustion engine 100 with respect to the comparative mode of the invention.

As described above, the variable valve device 122 for the internal combustion engine 100 according to the present embodiment mode of the invention retards the timing for closing the intake valve 110 with respect to the bottom dead center when the load is high. In other words, the variable valve device 122 retards the timing for closing the intake valve 110 when the load is high than when the load is low. It is preferable to retard the timing for closing the intake valve 110 to a maximum possible extent, while realizing the required volumetric efficiency $\eta_{v1}$ during high-load operation. Furthermore, it is preferable to set the timing for closing the intake valve 110 as ABDC 50° CA. Incidentally, in the case where the volumetric efficiency is desired to be raised because of an insufficient amount of intake air taken into the combustion chamber etc., the timing for closing the intake valve 110 can also be advanced. For example, the timing for closing the intake valve may be set as ABDC 40° CA.

Next, the valve characteristics during intermediate-load operation will be described. During intermediate operation, a transition from low load to high load is made. The variable valve device 122 according to the embodiment mode of the invention sets the timing for closing the intake valve 110 as a timing when the volumetric efficiency of the internal combustion engine 100 is maximized, when the load is intermediate. As shown in FIG. 11 (c), in the embodiment mode of the invention, the volumetric efficiency is higher than in the comparative mode of the invention, so the generation amount of smoke can be held small. Besides, since the pump loss is reduced, an improvement in fuel economy can be made. Incidentally, as shown in FIG. 11(c), the timing for closing the intake valve 110 when the volumetric efficiency is maximized is a single point. However, the intake valve 110 may be closed in accordance with a timing when the volumetric efficiency and the actual compression ratio are optimized, in order to cope with cases where the actual compression ratio fluctuates.

Figure 14:
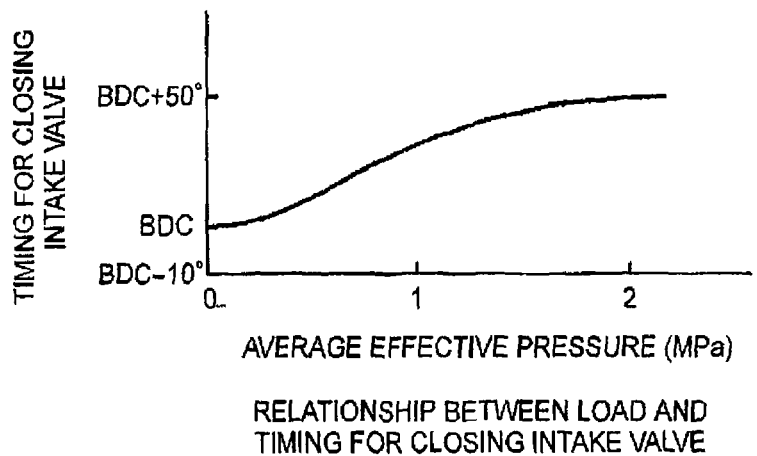
FIG. 14 is a view showing a relationship between the load of the internal combustion engine and the timing for closing the intake valve.
Figure 15:
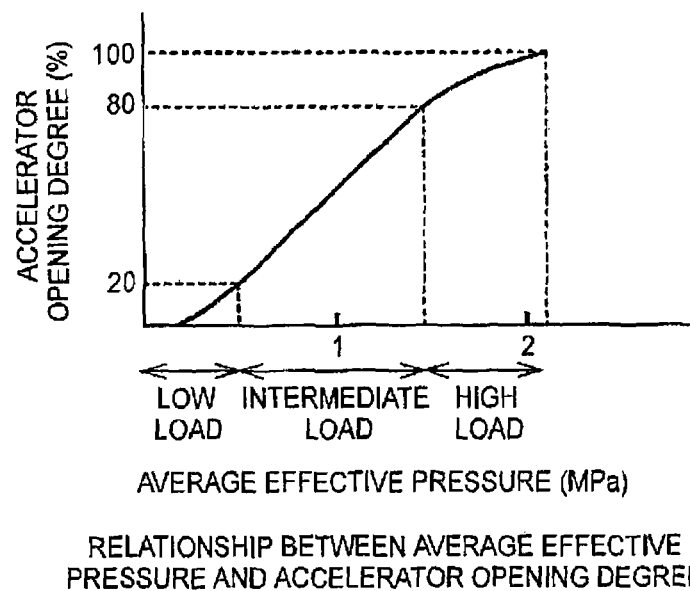
FIG. 15 is a view showing a relationship between an average effective pressure and an accelerator opening degree.
Figure 16:
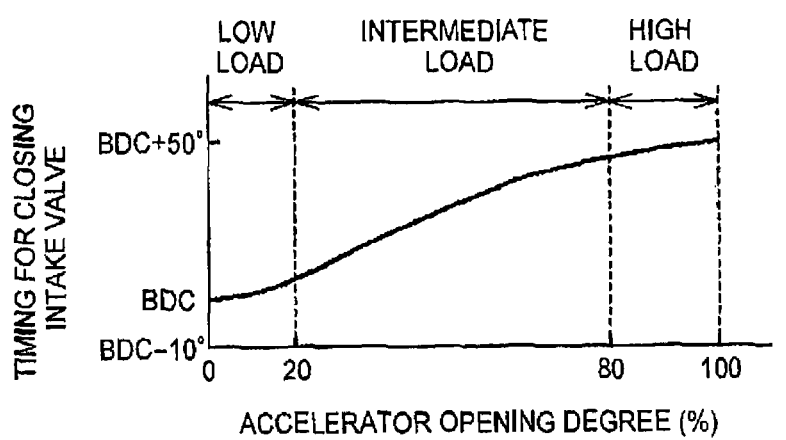
FIG. 16 is a view showing how the timing for closing the intake valve is related to the accelerator opening degree.

Besides, the timing for closing the intake valve during intermediate-load operation may be set by continuously changing the timing for closing the intake valve during a transition from low load to high load or during a transition in the opposite direction. The load and the timing for closing the intake valve 110 in the case where the timing for closing the intake valve 110 is continuously changed will be described herein with reference to FIGS. 14 to 16. FIG. 14 is a view showing a relationship between the load of the internal combustion engine 100 and the timing for closing the intake valve 110. FIG. 15 is a view showing a relationship between the average effective pressure and the accelerator opening degree, FIG. 16 is a view showing the timing for closing the intake valve 110 with respect to the accelerator opening degree.

FIG. 14 represents the load through the use of an average effective pressure Pme. The average effective pressure Pme is expressed by an expression (1) shown below.

$$Pme = \text{Torque} \times 4\pi / \text{Displacement} \tag{1}$$

As shown in FIG. 14, the variable valve device 122 for the internal combustion engine 100 according to the embodiment mode of the invention continuously changes the timing for closing the intake valve 110 from low load to high load. Besides, it is assumed that the accelerator opening degree is 100% when the accelerator is fully open. As shown in FIG. 15, the accelerator opening degree corresponding to a low-load region is set as 0 to 20%, the accelerator opening degree corresponding to an intermediate region is set as 20 to 80%, and the accelerator opening degree corresponding to a high-load region is set as 80 to 100%. As a result, referring to FIGS. 14 and 15, it is possible to set the timing for closing the intake valve 110 with respect to the accelerator opening degree as shown in FIG. 16.

As described above, the variable valve device 122 for the internal combustion engine 100 according to the embodiment mode of the invention retards the timing for closing the intake valve 110 and enlarges the working angle of the intake valve 110 as the load of the internal combustion engine 100 rises, while holding the timing for opening the intake valve 110 constant. In this manner, the variable valve device 122 for the internal combustion engine 100 provides a driving guideline for changing the valve lift of the intake valve in accordance with the state of the load of the internal combustion engine 100. Furthermore, the variable valve device 122 for the internal combustion engine 100 sets the timing for closing the intake valve 110 as the vicinity of the bottom dead center when the load is low. As a result, the fluctuation in the actual compression ratio can be reduced, and a stable combustion state can be realized. Besides, the variable valve device 122 according to the embodiment mode of the invention retards the timing for closing the intake valve 110 with respect to the bottom dead center when the load is high. As a result, the generation amount of smoke in the internal combustion engine 100 can be reduced. Besides, the output of the internal combustion engine 100 can be raised.

Second Embodiment

Next, the second embodiment of the invention will be described. An internal combustion engine according to the present embodiment of the invention is different in the configuration of intake ports from the internal combustion engine 100 according to the first embodiment of the invention. FIG. 17 is a view showing a first intake port 114a and a second intake port 114b of the internal combustion engine according to the present embodiment of the invention. FIG. 17 (a) is a perspective view of the first intake port 114a and the second intake port 114b. FIG. 17 (b) is a top view of the first intake port 114a and the second intake port 114b. The first intake port 114a is a tangential port. The tangential port introduces intake air into the combustion chamber 108 such that intake air flows in along a wall surface of the cylinder 102a of the combustion chamber 108. The first intake port 114a introduces intake air along the wall surface of the cylinder 102a, and generates a strong swirl current $f_1$ in the combustion chamber 108. As the flow rate of intake air supplied from this first intake port 114a increases, the intensity of the swirl current (swirl ratio) generated in the combustion chamber 108 is enhanced. The second intake port 114b is a helical port. The helical port is a spirally formed port, and supplies intake air to a central portion of the combustion chamber 108. The center of the combustion chamber 108 indicates a center of a cross-sectional circle at the time when the cylinder 102a is cut perpendicularly to an axis thereof. The second intake port 114b introduces a weak swirl current $f_2$ to the center of the combustion chamber 108. The intake air supplied from the second intake port 114b remains at the center in the combustion chamber 108, and is restrained from being diffused.

The first intake port 114a is provided with a first intake valve 110a, and the second intake port 114b is provided with a second intake valve 110b. Furthermore, a variable valve mechanism (not shown) that drives the first intake valve 110a and the second intake valve 110b is provided. The variable valve mechanism according to the present embodiment of the invention is configured in the same manner as the variable valve mechanism 10 according to the first embodiment of the invention. The variable valve mechanism according to the present embodiment of the invention is equipped with a first guide member for changing the rotational speed of only the cam piece acting on the first intake valve 110a, and a second guide member for changing the rotational speed of only the cam piece acting on the second intake valve 110b. Accordingly, the variable valve mechanism according to the present embodiment of the invention drives the first intake valve 110a and the second intake valve 110b independently of each other. The variable valve mechanism according to the present embodiment of the invention can change the working angle of the first intake valve 110a while holding the maximum lift amount of the first intake valve 110a constant, and can change the working angle of the second intake valve 110b while holding the maximum lift amount of the second intake valve 110b constant. Besides, the second embodiment of the invention is identical in other configurational details to the first embodiment of the invention. The same components as in the first embodiment of the invention are denoted by the same reference numerals respectively in the drawings, and the detailed description thereof will be omitted.

In the internal combustion engine according to the present embodiment of the invention, the swirl ratio in the combustion chamber 108 is lowered from the standpoint of suppressing misfire and reducing the amount of unburned HC when the load is low, and the swirl ratio in the combustion chamber 108 is enhanced from the standpoint of discharging smoke when the load is high. Besides, in the internal combustion engine according to the present embodiment of the invention, the timing for closing the intake valve (the first intake valve 110a or the second intake valve 110b) is set as the vicinity of the bottom dead center (BDC) with a view to stabilizing the actual compression ratio, during low-load operation. Then, for the purpose of suppressing the generation of smoke, the timing for closing the intake valve (the first intake valve 110a or the second intake valve 110b) is set so as to be retarded as the load of the internal combustion engine rises.

Figure 18:
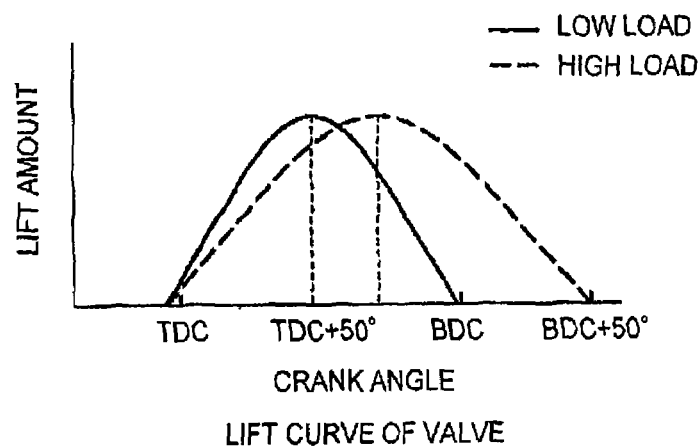
FIG. 18 is a view showing an example of a lift curve of a valve that opens in the vicinity of a top dead center.
Figure 19:
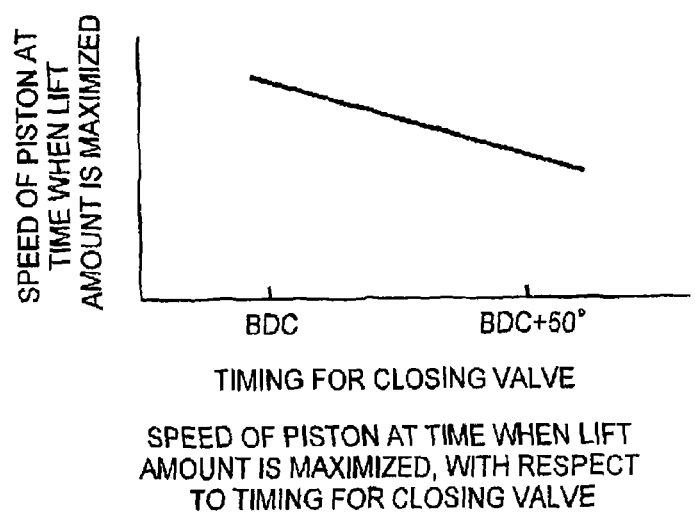
FIG. 19 is a view showing a relationship between a timing for closing the valve that opens in the vicinity of the top dead center and a speed of a piston at a time when the lift amount of the valve is maximized.
Figure 20:
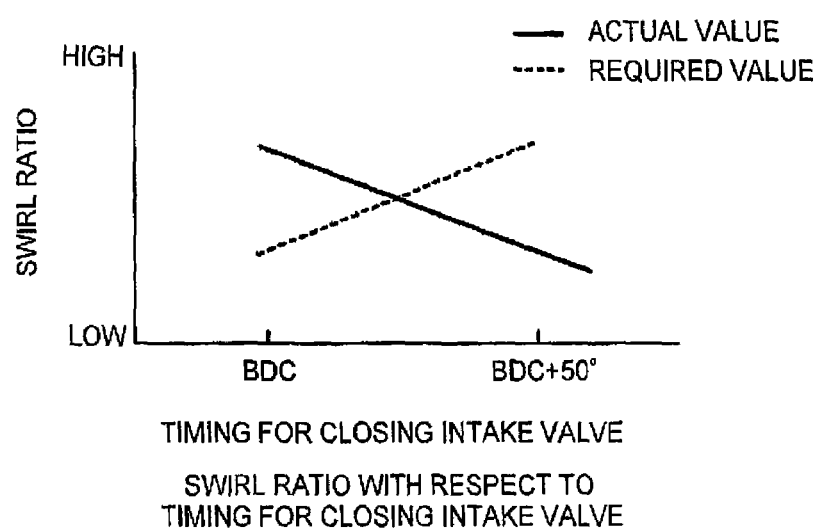
FIG. 20 is a view showing a swirl ratio with respect to the timing for closing the intake valve.

FIG. 18 is a view showing an example of a lift curve of a valve. A solid line in FIG. 18 is a graph indicating the lift curve of a valve that opens in the vicinity of a top dead center (TDC) and closes in the vicinity of the bottom dead center (BDC). A broken line in FIG. 18 is a graph indicating the lift curve of a valve that opens in the vicinity of the top dead center (TDC) and closes at a timing retarded by 50° CA from the bottom dead center (ABDC 50° CA). FIG. 19 is a view showing a relationship between the timing for closing a valve and the speed of a piston at the time when the lift amount of the valve is maximized, in an internal combustion engine having the valve, which opens in the vicinity of the top dead center. FIG. 20 is a view showing the swirl ratio with respect to the timing for closing the intake valve. A solid line in FIG. 20 indicates an actual swirl ratio, and a dotted line in FIG. 20 indicates a required value.

With the valve that is lifted according to the lift curve indicated by the solid line in FIG. 18, the lift amount of the valve is maximized in the vicinity of ATDC 90° CA (BBDC 90° CA). In the vicinity of ATDC 90° CA, the moving speed of the piston is the highest, so the intake speed is high. Accordingly, in this case, in the vicinity of ATDC 90° CA, the lift amount is large and the intake speed is high, so the amount of intake air sucked into the combustion chamber 108 is large.

As described above, if the first intake valve 110a is driven according to the guideline of the first embodiment of the invention, the first intake valve 110a opens in the vicinity of the top dead center (TDC), and closes in the vicinity of the bottom dead center (BDC) when the load is low. However, since the first intake port 114a is a tangential port, the amount of intake air sucked into the combustion chamber 108 increases if the first intake valve 110a opens in the vicinity of the top dead center (TDC) and closes in the vicinity of the bottom dead center (BDC). As a result, a swirl current in the combustion chamber 108 is intensified, and the control guideline of lowering the swirl ratio when the load is low is contradicted.

Subsequently, with the valve that is lifted according to the lift curve indicated by the broken line in FIG. 18, the time point when the lift amount is maximized deviates from the vicinity of ATDC 90° CA (BBDC 90° CA). As described above, at the timing in the vicinity of ATDC 90° CA, the moving speed of the piston is the highest, so the intake speed is high. With the lift of this valve, the lift is not maximized at the timing of ATDC 90° CA when the intake speed is high. Therefore, intake air cannot be effectively sucked in.

As described above, if the first intake valve 110a is driven according to the guideline of the first embodiment of the invention, the first intake valve 110a opens in the vicinity of the top dead center (TDC) and closes at 50° CA after the bottom dead center (ABDC 50° CA) when the load is high. In this case, in the vicinity of the bottom dead center where the speed of the piston is the highest and the intake speed is maximized, the lift amount of the first intake valve 110a is not maximized, so a sufficient amount of intake air cannot be sucked into the combustion chamber 108. Thus, s swirl is not sufficiently intensified, and the swirl ratio cannot be enhanced.

Accordingly, if the first intake valve 110a is driven according to the guideline of the first embodiment of the invention, the required value of the swirl ratio and the actual value of the swirl ratio do not coincide with each other as shown in FIG. 20. In consideration of the foregoing, the working angle of the first intake valve 110a is changed in the present embodiment of the invention. FIG. 21 is a view showing lift curves of the first intake valve 110a and the second intake valve 110b. FIG. 21 (a) shows the lift curves at the time when the load is low, and FIG. 21 (b) shows the lift curves at the time when the load is high. In both FIG. 21 (a) and FIG. 21 (b), a broken line indicates the lift curve of the first intake valve 110a, and a solid line indicates the lift curve of the second intake valve 110b.

First of all, a relationship between the maximum lift amount of the first intake valve 110a and the maximum lift amount of the second intake valve 110b will be described. As shown in FIGS. 21 (a) and 21 (b), in the variable valve device according to the present embodiment of the invention, the maximum lift amount of the first intake valve 110a is set smaller than the maximum lift amount of the second intake valve 110b.

Next, the valve characteristics at the time when the load is low will be described. The valve characteristics of the second intake valve 110b are the same as the valve characteristics of the intake valve 110 according to the first embodiment of the invention. As shown in FIG. 21 (a), the variable valve device changes the valve-open period of the first intake valve 110a such that the crank angle at which the lift amount of the first intake valve 110a is maximized becomes smaller than the crank angle at which the speed of the piston is maximized, when the load of the internal combustion engine is low. Specifically, the variable valve device shifts the time point when the lift amount of the first intake valve 110a is maximized, to a time point equal to or earlier than ATDC 90° CA. Preferably, the variable valve device sets the time point when the lift amount of the first intake valve 110a is maximized, as ATDC 70° CA. At this time, the timing for opening the second intake valve 110b is in the vicinity of the TDC, and the timing for closing the second intake valve 110b is in the vicinity of the BDC. Thus, the time point when the lift amount of the second intake valve 110b is maximized is in the vicinity of ATDC 90° CA.

According to the foregoing configuration, the time point when the lift amount of the first intake valve 110a is maximized deviates from the vicinity of ATDC 90° CA where the intake speed is maximized. Thus, intake air is restrained from being taken into the combustion chamber 108 from the first intake port 114a. On the other hand, the time point when the lift amount of the second intake valve 110b is maximized is in the vicinity of ATDC 90° CA where the intake speed is maximized. Thus, the amount of intake air taken into the combustion chamber 108 from the second intake port 114b increases. Besides, since the lift amount of the first intake valve 110a is smaller than the lift amount of the second intake valve 110b, the interior of the combustion chamber 108 is dominated by intake air from the second intake port 114b. The second intake port 114b is a helical port. Therefore, the interior of the combustion chamber 108 is dominated by intake air from the helical port, and the swirl ratio in the combustion chamber 108 is lowered.

Next, the lift at the time when the load is high will be described. The valve characteristics of the second intake valve 110b are the same as the valve characteristics of the intake valve 110 according to the first embodiment of the invention. As shown in FIG. 21 (b), the variable valve device changes the valve-open period of the first intake valve 110a such that the crank angle at which the lift amount of the first intake valve 110a is maximized becomes equal to the crank angle at which the speed of the piston is maximized, when the load of the internal combustion engine is high. Preferably, the variable valve device sets the time point when the lift amount of the first intake valve 110a is maximized, as the vicinity of ATDC 90° CA. More specifically, the variable valve device sets the time point when the lift amount of the first intake valve 110a is maximized, as ATDC 90±10° CA. At this time, with a view to reducing the actual compression ratio, it is preferable to retard the timing for closing the first intake valve 110a to a maximum possible extent. The timing when the lift amount is maximized is determined as described above. Therefore, if the timing for closing the first intake valve 110a is retarded, the timing for opening the first intake valve 110a is advanced with respect to the TDC. On the other hand, the timing for opening the second intake valve 110b is in the vicinity of the TDC, and the timing for closing the second intake valve 110b is ABDC 50° CA. Thus, the time point when the lift amount of the second intake valve 110b is maximized deviates from the vicinity of ATDC 90° CA.

According to the foregoing configuration, the time point when the lift amount of the first intake valve 110a is maximized is in the vicinity of ATDC 90° CA where the intake speed is maximized. Thus, the amount of intake air taken into the combustion chamber 108 from the first intake port 114a increases. On the other hand, the time point when the lift amount of the second intake valve 110b is maximized deviates from the vicinity of ATDC 90° CA where the intake speed is maximized. Thus, intake air is restrained from being taken into the combustion chamber 108 from the second intake port 114b. In the configuration according to the present embodiment of the invention, the lift amount of the first intake valve 110a is smaller than the lift amount of the second intake valve 110b. However, when the load is high, the amount of intake air taken in from the first intake port 114a as a tangential port is large, so a swirl in the combustion chamber 108 is intensified. Besides, the first intake valve 110a opens earlier than the second intake valve 110b, so a swirl current is intensified.

Figure 22:
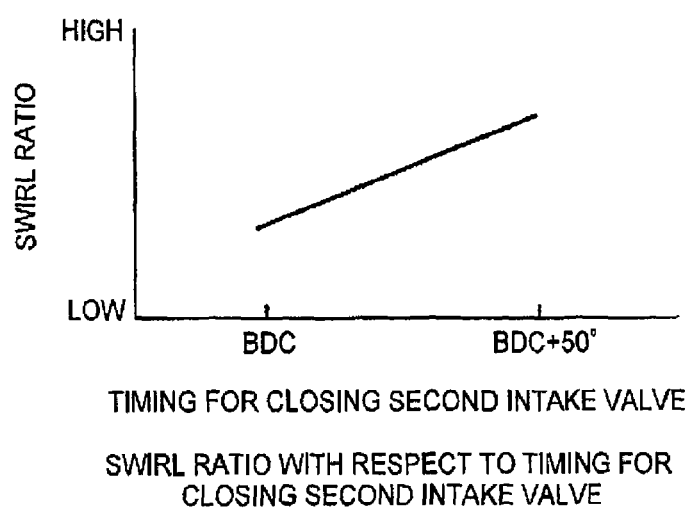
FIG. 22 is a view showing a swirl ratio in a combustion chamber with respect to a timing for closing the second intake valve.

FIG. 22 is a view showing the swirl ratio in the combustion chamber 108 with respect to the timing for closing the second intake valve 110b. As shown in FIG. 22, the swirl ratio is enhanced as the timing for closing the second intake valve 110b is retarded. That is, as soon as the timing for closing the second intake valve 110b becomes equal to the BDC, the time point when the lift amount of the first intake valve 110a is maximized becomes the earliest (is most advanced). Then, the time point when the lift amount of the first intake valve 110a is maximized is set so as to become equal to ATDC 90° CA, as soon as the working angle of the second intake valve 110b is maximized (at the timing for closing the second intake valve 110b, ABDC 50° CA). As a result of the foregoing, the variable valve device for the internal combustion engine according to the present embodiment of the invention can lower the swirl ratio when the load is low, and can suppress misfire of the internal combustion engine and reduce the amount of unburned HC. Besides, the variable valve device for the internal combustion engine according to the present embodiment of the invention makes it possible to stabilize the actual compression ratio at the time when the load is low, and suppress a fluctuation in combustion, by setting the valve characteristics of the second intake valve 110b the same as in the first embodiment of the invention. When the load is high, the variable valve device for the internal combustion engine according to the present embodiment of the invention can enhance the swirl ratio in the combustion chamber 108 and reduce the discharge amount of smoke. Furthermore, the variable valve device for the internal combustion engine according to the present embodiment of the invention can lower the actual compression ratio at the time when the load is high, and suppress the generation of smoke, by setting the valve characteristics of the second intake valve 110b the same as in the first embodiment of the invention.

Besides, FIG. 23 shows another example of the lift curves according to the present embodiment of the invention. FIG. 23 (a) shows the lift curves at the time when the load is low, and FIG. 23 (b) shows the lift curves at the time when the load is high. In this manner, the timing for opening the first intake valve 110a may be set as the top dead center (TDC). In both FIGS. 23 (a) and 23 (b), a broken line indicates the lift curve of the first intake valve 110a, and a solid line indicates the lift curve of the second intake valve 110b.

Third Embodiment

Next, the third embodiment of the invention will be described. The internal combustion engine according to the present embodiment of the invention is substantially identical in configuration to the internal combustion engine according to the second embodiment of the invention. However, the present embodiment of the invention is different in the lift curve of the first intake valve 110a from the first and second embodiments of the invention. The present embodiment of the invention is identical in other configurational details to the second embodiment of the invention. The detailed description of the same configurational details as in the second embodiment of the invention will be omitted. In the following description, components identical to those of the second embodiment of the invention are denoted by the same reference numerals respectively. FIG. 24 is a view showing the lift curves according to the present embodiment of the invention. FIG. 24 (a) shows the lift curves at the time when the load is low, and FIG. 24 (b) shows the lift curves at the time when the load is high. In both FIGS. 24 (a) and 24 (b), a broken line indicates the lift curve of the first intake valve 110a, and a solid line indicates the lift curve of the second intake valve 110b.

In the present embodiment of the invention, the lift amount of the first intake valve 110a is set so as to be maximized in the first half of the valve-open period. In other words, with the lift curve of the first intake valve 110a, the crank angle at the time when the lift amount is maximized is advanced with respect to the crank angle as an intermediate value between the timing for opening the first intake valve 110a and the timing for closing the first intake valve 110a. Specifically, when the load is low, the timing for opening the first intake valve 110a is in the vicinity of the TDC, and the timing for closing the first intake valve 110a is in the vicinity of the BDC. However, according to this configuration, the crank angle at which the maximum lift amount is reached is equal to ATDC 70° CA. Furthermore, when the load is high, the timing for opening the first intake valve 110a is in the vicinity of the TDC, and the timing for closing the first intake valve 10a is ABDC 50° CA. However, according to this configuration, the crank angle at which the maximum lift amount is reached is equal to ATDC 90° CA. While the timing for opening the first intake valve 110a is held constant, the timing for closing the first intake valve 110a is retarded as the load rises. The valve characteristics of the second intake valve 110b are the same as in the second embodiment of the invention. That is, when the load is low, the timing for opening the second intake valve 110b is in the vicinity of the TDC, and the timing for closing the second intake valve 110b is in the vicinity of the BDC. The timing for closing the second intake valve 110b is retarded as the load rises. When the load is high, the timing for opening the second intake valve 110b is in the vicinity of the TDC, and the timing for closing the second intake valve 110b is equal to ABDC 50° CA. Furthermore, both the first intake valve 110a and the second intake valve 110b have the valve characteristics in which the working angle thereof changes while the maximum lift amount thereof is held constant.

The variable valve device for the internal combustion engine according to the present embodiment of the invention can lower the swirl ratio when the load is low, and can intensify the swirl ratio when the load is high, by changing the cam profile and changing the crank angle at which the maximum lift amount is reached. Thus, the variable valve device for the internal combustion engine according to the present embodiment of the invention lowers the swirl ratio, suppresses misfire, and reduces the amount of unburned HC when the load is low, thereby making it possible to stabilize the actual compression ratio and realize stable combustion. Besides, the variable valve device for the internal combustion engine enhances the swirl ratio and reduces the actual compression ratio when the load is high, thereby making it possible to curb the generation of smoke.

Fourth Embodiment

Figure 25:
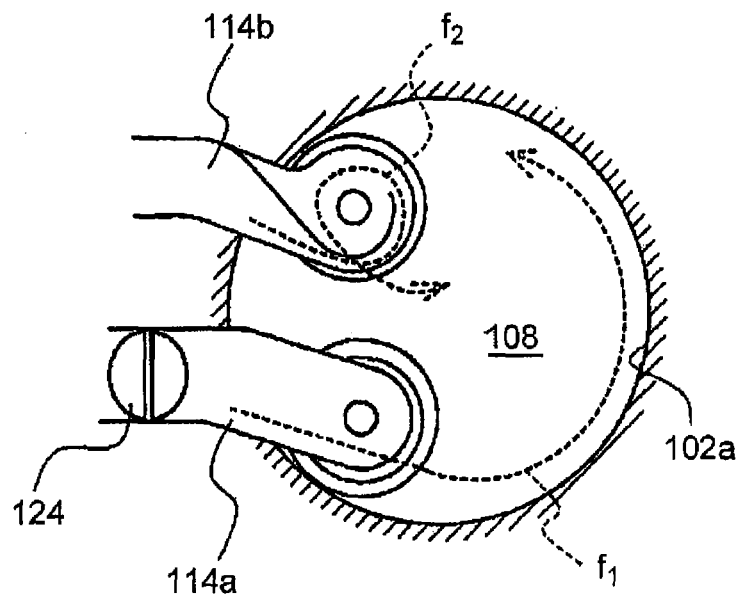
FIG. 25 is a top view of a first intake port and a second intake port of an internal combustion engine according to the fourth embodiment of the invention.

Next, the fourth embodiment of the invention will be described. The internal combustion engine according to the present embodiment of the invention is substantially identical in configuration to the internal combustion engine according to the second embodiment of the invention. However, the present embodiment of the invention is different from the second embodiment of the invention in that the first intake port 114a is equipped with a swirl control valve (SCV) 124. Besides, the lift curves of the first intake valve 110a and the second intake valve 110b are different from those of the second embodiment of the invention. Incidentally, the fourth embodiment of the invention is identical in other configurational details to the second embodiment of the invention. In the drawings, components identical to those of the second embodiment of the invention are denoted by the same reference numerals respectively, and the detailed description thereof will be omitted. FIG. 25 is a top view of the first intake port 114a and the second intake port 114b of the internal combustion engine according to the present embodiment of the invention. The first intake port 114a is provided with the SCV 124. When the opening of the SCV 124 is widened, the amount of intake air flowing through the first intake port 114a increases, and the amount of intake air flowing into the combustion chamber 108 increases. On the contrary, when the opening of the SCV 124 is narrowed, the amount of intake air flowing through the first intake port 114a decreases, and the amount of intake air flowing into the combustion chamber 108 decreases.

In the present embodiment of the invention, the lift curve of the first intake valve 110a and the lift curve of the second intake valve 110b are identical to each other. The lift curve of the first intake valve 110a and the second intake valve 110b is the lift curve described in FIGS. 12 and 13 of the first embodiment of the invention. Besides, the valve characteristics are also the same. That is, the timing for opening the first intake valve 110a or the second intake valve 110b is set as the vicinity of TDC, and the timing for closing the first intake valve 110a or the second intake valve 110b is changed in accordance with the load.

Figure 26:
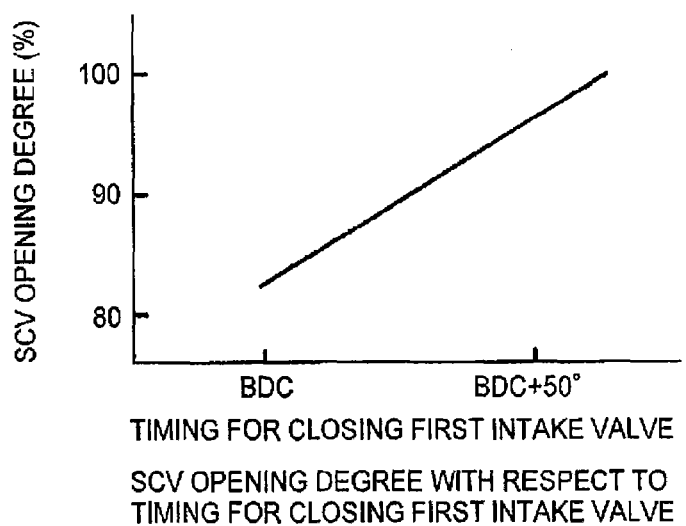
FIG. 26 is a view showing an opening degree of a swirl control valve with respect to the timing for closing the first intake valve.

FIG. 26 is a view showing the opening degree of the SCV 124 with respect to the timing for closing the first intake valve 110a. As shown in FIG. 26, if the timing for closing the first intake valve 110a is in the vicinity of BDC, the opening of the SCV 124 is narrowed. If the timing for closing the first intake valve 110a is in the vicinity of BDC, the internal combustion engine is operated at low load. In this case, the amount of intake air passing through the first intake port 114a is reduced by narrowing the opening of the SCV 124. As a result, the swirl ratio in the combustion chamber 108 can be held low.

On the contrary, the opening of the SCV 124 is widened as the timing for closing the first intake valve 110a is retarded. It is safe to assume that the timing for closing the first intake valve 110a is determined in accordance with the load of the internal combustion engine, and that the load rises as the timing for closing the first intake valve 110a is retarded. Accordingly, the opening of the SCV 124 widens as the load rises. Thus, as the load rises, the amount of intake air passing through the first intake port 114a increases, and the swirl ratio in the combustion chamber 108 is enhanced.

The variable valve device for the internal combustion engine according to the present embodiment of the invention drives the first intake valve 110a and the second intake valve 110b according to the same guideline as in the first embodiment of the invention, and hence suppresses a fluctuation in the actual compression ratio and stabilizes the state of combustion when the load is low. Besides, the variable valve device for the internal combustion engine according to the present embodiment of the invention reduces the actual compression ratio and suppresses the generation of smoke when the load is high. Furthermore, the variable valve device for the internal combustion engine according to the present embodiment of the invention lowers the swirl ratio by the SCV 124, and hence suppresses misfire and reduces the generation of unburned HC when the load is low. Besides, the variable valve device for the internal combustion engine according to the present embodiment of the invention enhances the swirl ratio and hence suppresses the generation of smoke when the load is high.

Incidentally, in the present embodiment of the invention, the lift curve of the first intake valve 110a and the lift curve of the second intake valve 110b are set identical to each other. However, as is the case with the second and third embodiments of the invention, the maximum lift amount of the first intake valve 110a may be set smaller than the maximum lift amount of the second intake valve 110b. Besides, instead of the first intake port 114a, the second intake port 114b as a helical port may be provided with the SCV. In this case, the opening of the SCV may be widened when the load is low, and the opening of the SCV may be narrowed when the load is high.

As described above in the first to fourth embodiments of the invention, the invention can provide a variable valve device for an internal combustion engine that is equipped with a variable valve mechanism capable of changing the working angle of an intake valve while holding the maximum lift amount of the intake valve constant, and that drives the intake valve in accordance with the state of a load of the internal combustion engine.

The aforementioned embodiments of the invention are nothing more than examples for carrying out the invention, and the invention should not be limited to these. Various modifications of these embodiments of the invention are within the scope of the invention. Furthermore, it is evident from the foregoing description that various other embodiments are possible within the scope of the invention.

DESCRIPTION OF REFERENCE NUMERALS

10 . . . VARIABLE VALVE MECHANISM
100 . . . INTERNAL COMBUSTION ENGINE
110 . . . INTAKE VALVE
110a . . . FIRST INTAKE VALVE
110b . . . SECOND INTAKE VALVE
114a . . . FIRST INTAKE PORT (TANGENTIAL PORT)
114b . . . SECOND INTAKE PORT (HELICAL PORT)
120 . . . ECU
122 . . . VARIABLE VALVE DEVICE
124 . . . SWIRL CONTROL VALVE

The invention claimed is:

1. A variable valve device for an internal combustion engine, the variable valve device comprising:
    a variable valve mechanism that can change a working angle of an intake valve while holding a maximum lift amount of the intake valve constant, and
    the variable valve device is configured to retard a timing for closing the intake valve as a load of the internal combustion engine rises and enlarge the working angle, while holding a timing for opening the intake valve constant, wherein
    the internal combustion engine includes a tangential port and a helical port through which intake air is supplied to a cylinder of the internal combustion engine,
    a maximum lift amount of a first intake valve that is provided in the tangential port is smaller than a maximum lift amount of a second intake valve that is provided in the helical port, and
    the variable valve device changes a timing for closing the first intake valve such that a crank angle at which a lift amount of the first intake valve is maximized becomes smaller than a crank angle at which a speed of a piston is maximized, when the load of the internal combustion engine is low.

2. The variable valve device for the internal combustion engine according to claim 1, wherein
    the variable valve device sets the timing for closing the intake valve as a vicinity of a bottom dead center when the load of the internal combustion engine is low.

3. The variable valve device for the internal combustion engine according to claim 2, wherein
    the variable valve device retards the timing for closing the intake valve with respect to the vicinity of the bottom dead center when the load of the internal combustion engine is high.

4. The variable valve device for the internal combustion engine according to claim 1, wherein
    the variable valve device changes the timing for closing the intake valve such that a volumetric efficiency is maximized, when the load of the internal combustion engine is intermediate.

5. The variable valve device for the internal combustion engine according to claim 1, wherein
    the lift amount of the first intake valve is set in such a manner as to be maximized in a first half of a valve-open period.

6. The variable valve device for the internal combustion engine according to claim 1, wherein
    the tangential port is equipped with a swirl control valve that adjusts a swirl current.

7. A variable valve device for an internal combustion engine the variable valve device comprising:
    a variable valve mechanism that can change a working angle of an intake valve while holding a maximum lift amount of the intake valve constant, and
    the variable valve device is configured to retard a timing for closing the intake valve as a load of the internal combustion engine rises and enlarge the working angle, while holding a timing for opening the intake valve constant, wherein the internal combustion engine includes a tangential port and a helical port through which intake air is supplied to a cylinder of the internal combustion engine, a maximum lift amount of a first intake valve that is provided in the tangential port is smaller than a maximum lift amount of a second intake valve that is provided in the helical port, and the variable valve device changes a timing for closing the first intake valve such that a crank angle at which a lift amount of the first intake valve is maximized becomes equal to a crank angle at which a speed of a piston is maximized, when the load of the internal combustion engine is high.

8. The variable valve device for the internal combustion engine according to claim 7, wherein the lift amount of the first intake valve is set in such a manner as to be maximized in a first half of a valve-open period.

9. The variable valve device for the internal combustion engine according to claim 7, wherein the tangential port is equipped with a swirl control valve that adjusts a swirl current.

* * * * *